(12) United States Patent
Gregory

(10) Patent No.: US 11,105,674 B2
(45) Date of Patent: Aug. 31, 2021

(54) METHOD AND SYSTEM OF MANAGING THE ACQUISITION OF FOOD IN A COMMERCIAL ENVIRONMENT

(71) Applicant: GREGORY INNOVATIONS, LLC, Carlsbad, NM (US)

(72) Inventor: Norman Scott Gregory, Carlsbad, NM (US)

(73) Assignee: Gregory Innovations, LLC, Carlsbad, NM (US)

( * ) Notice: Subject to any disclaimer, the term of this patent is extended or adjusted under 35 U.S.C. 154(b) by 182 days.

(21) Appl. No.: 16/453,106

(22) Filed: Jun. 26, 2019

(65) Prior Publication Data

US 2020/0408588 A1 Dec. 31, 2020

(51) Int. Cl.
*G01G 19/414* (2006.01)
*A47G 23/12* (2006.01)
*G01G 3/145* (2006.01)

(52) U.S. Cl.
CPC ......... *G01G 19/4146* (2013.01); *A47G 23/12* (2013.01); *G01G 3/145* (2013.01)

(58) Field of Classification Search
CPC .............. G01G 3/145; G01G 19/4146; G01G 23/3728; G06Q 50/12; A47G 23/12
See application file for complete search history.

(56) References Cited

U.S. PATENT DOCUMENTS

| 4,961,533 A | * | 10/1990 | Teller | G06Q 10/087 |
| | | | | 177/25.19 |
| 7,132,926 B2 | * | 11/2006 | Vaseloff | G06Q 10/087 |
| | | | | 340/5.92 |
| 7,415,375 B2 | | 8/2008 | Shakman et al. | |
| 7,432,454 B1 | | 10/2008 | Sze et al. | |
| 7,541,548 B1 | * | 6/2009 | Sze | G01G 19/4146 |
| | | | | 177/25.16 |
| 8,330,057 B2 | | 12/2012 | Sharawi et al. | |
| 8,770,983 B2 | * | 7/2014 | Batsikouras | G09B 19/0092 |
| | | | | 434/127 |

(Continued)

FOREIGN PATENT DOCUMENTS

| CN | 201278169 Y | 7/2009 |
| CN | 202422301 U | 9/2012 |

(Continued)

*Primary Examiner* — Natalie Huls
(74) *Attorney, Agent, or Firm* — Mark E. Scott; Jonathan H. Harder; Dickinson Wright PLLC

(57) ABSTRACT

A method and system of managing the acquisition of food in a commercial environment. An example method includes receiving, from a first scale, a container weight of a container when food is removed from the container. The method also includes determining a removed weight of the food from the container based on the container weight relative to an initial container weight, receiving, from a second scale, a plate weight of a plate when the food is added to the plate. The method also includes determining an added weight of the food to the plate based on the plate weight relative to an initial plate weight, determining whether the removed weight and the added weight match, and responsive to determining that the removed weight and the added weight match, providing information related to the food to be presented on a user interface at the food station.

19 Claims, 16 Drawing Sheets

(56) References Cited

U.S. PATENT DOCUMENTS

| | | | |
|---|---|---|---|
| 9,364,106 B1* | 6/2016 | Ortiz | A47G 19/027 |
| 10,267,670 B2* | 4/2019 | Ashmore | G01G 19/4146 |
| 10,502,614 B2* | 12/2019 | Batsikouras | G01G 21/22 |
| 10,832,311 B2* | 11/2020 | Chomley | G06K 9/4628 |
| 2006/0196935 A1* | 9/2006 | Muto | G06Q 20/201 |
| | | | 235/383 |
| 2007/0050058 A1* | 3/2007 | Zuziak | G16H 20/60 |
| | | | 700/90 |
| 2007/0116084 A1 | 5/2007 | Rund et al. | |
| 2007/0162325 A1 | 7/2007 | Singer-Harter | |
| 2007/0210154 A1* | 9/2007 | Suto | G06Q 30/0283 |
| | | | 235/383 |
| 2007/0254080 A1* | 11/2007 | Schackmuth | G06Q 50/12 |
| | | | 426/523 |
| 2008/0052200 A1* | 2/2008 | Bodin | G06Q 10/0875 |
| | | | 705/28 |
| 2010/0097193 A1 | 4/2010 | Tang | |
| 2013/0025944 A1 | 1/2013 | Batsikouras | |
| 2013/0284806 A1 | 10/2013 | Margalit | |
| 2014/0122262 A1 | 5/2014 | Jung et al. | |
| 2014/0315162 A1 | 10/2014 | Ehrenkranz | |
| 2015/0127496 A1* | 5/2015 | Marathe | G06Q 10/087 |
| | | | 705/28 |
| 2016/0034907 A1 | 2/2016 | Worrall et al. | |
| 2017/0358020 A1* | 12/2017 | Bender | G06Q 30/0621 |
| 2020/0103271 A1* | 4/2020 | Abou Mahmoud | G01G 19/414 |
| 2020/0365250 A1* | 11/2020 | Kim | G06Q 30/0206 |

FOREIGN PATENT DOCUMENTS

| | | |
|---|---|---|
| CN | 203038375 U | 7/2013 |
| WO | 2016141080 A1 | 9/2016 |

\* cited by examiner

1100

| Receive, from communication circuity of the second weigh scale, another plate weight of the plate when an item is added to the plate |
| --- |
| 1102 |

| Determining another added weight of the item to the plate based on the another plate weight relative to the plate weight |
| --- |
| 1104 |

| Determining whether another removed weight of food from the first container corresponding to the another added plate weight was received from the communication circuitry of the first weight scale |
| --- |
| 1106 |

| Responsive to determining that the another removed weight of food from the first container corresponding to the another added plate weight was not received, provide an error indication to the first food station that the item is placed on the plate |
| --- |
| 1108 |

Activate a locking mechanism to secure a plate in place when the plate is initially disposed on the second weigh scale
1302

Responsive to determining that the removed weight and the added weight do not match, maintain the locking mechanism in a locked position
1304

Responsive to determining that the removed weight and the added weight match, deactivate the locking mechanism to release the plate
1306

*FIG. 13*

METHOD AND SYSTEM OF MANAGING THE ACQUISITION OF FOOD IN A COMMERCIAL ENVIRONMENT

BACKGROUND

One example commercial environment may include a restaurant where food is acquired by a patron in exchange for a sum of money. Some restaurants may be buffet-style where a patron obtains a plate and walks around to various food stations acquiring whatever food the patron desires to the plate. Some of these types of restaurants may charge a flat price (e.g., $19.95) for the buffet-style meal and the patron may eat as much food as they desire. Another example commercial environment where food may be acquired is a grocery store that includes several food stations. A patron may add food from the food stations to a plate or container. When the patron is ready to checkout, the patron may place the plate or container on a weigh scale at a checkout station and the checkout station may determine the price based on the cumulative weight of the various food added to the plate or container.

BRIEF DESCRIPTION OF THE DRAWINGS

For a detailed description of example embodiments, reference will now be made to the accompanying drawings in which:

FIG. 11 shows a method in accordance with various embodiments;

FIG. 13 shows a method in accordance with various embodiments; and

DEFINITIONS

Figure 1:
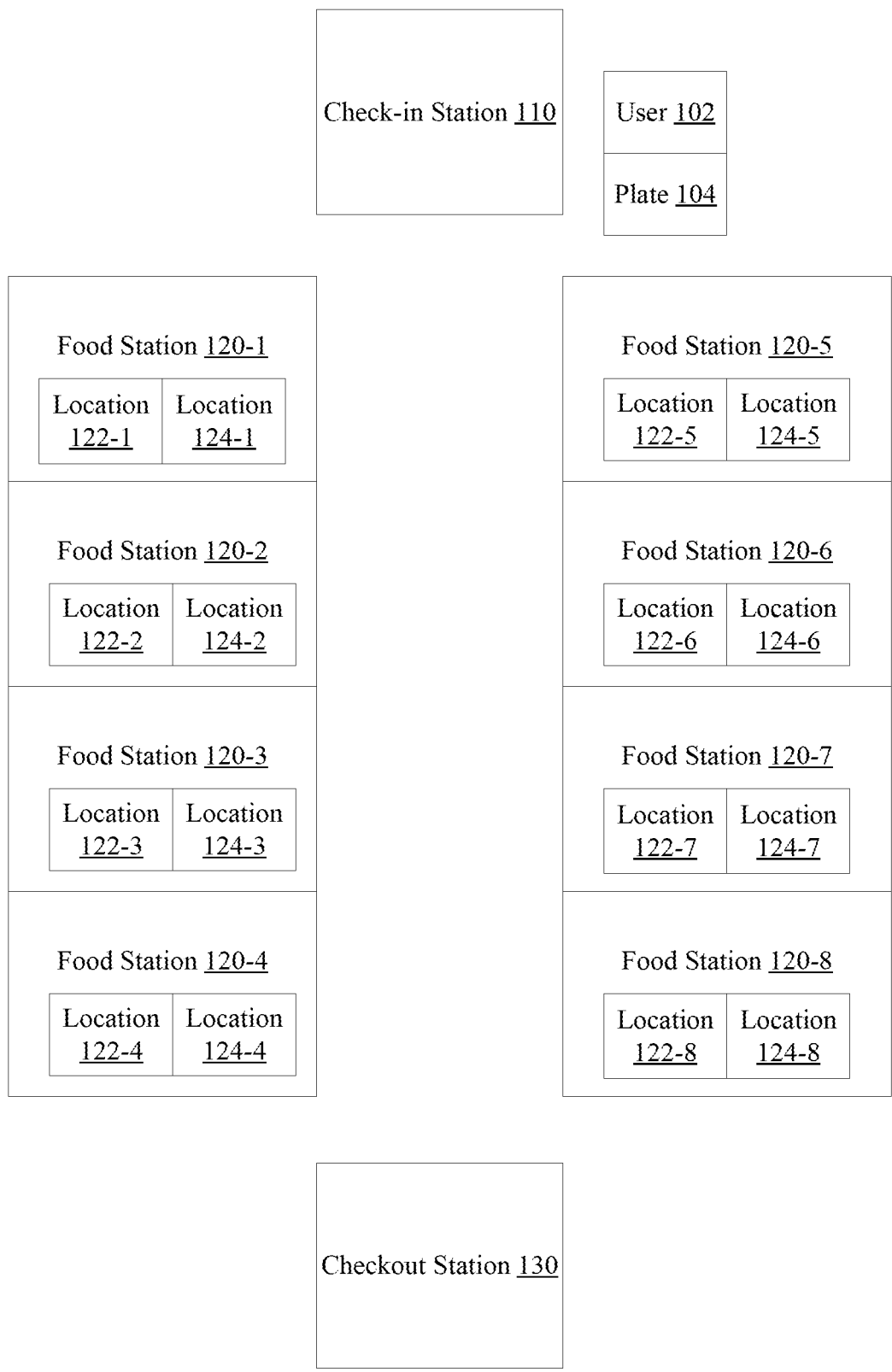
FIG. 1 shows an overhead view of a buffet-style restaurant using an example system in accordance with various embodiments.

Certain terms are used throughout the following description and claims to refer to particular hardware and software components. As one skilled in the art will appreciate, different companies may refer to components by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Entities that sell food, such as restaurants, grocery stores, food trucks, and the like, often buy food by the pound. However, the entities may sell the food by the piece. This can lead to a loss of profit for the distributors depending on the weight of the food bought and the number of pieces that are sold. For example, if an entity pays a dollar a pound for a nine pound chicken and sells an eight piece basket of chicken, the entity may not make a profit on the transaction. An improvement is desired to sell food at a price that is determined based on the weight of the food being acquired.

Further, as discussed above, some buffet-style restaurants may charge a flat price. Particularly hungry individuals may fill up their plate many times and the value of the food consumed may greatly exceed the flat price. On the other hand, a person who is not hungry or unable to eat very much may consume very little food and the value of the food consumed may be less than the flat price. In such a scenario, the buffet-style restaurant cost averages the various types of patrons and may or may not make a profit. An improvement is desired to more accurately track and account for the exact amount of food that is acquired by a patron and to charge a price commensurate with that exact amount of food.

In some instances, a patron may put numerous different types of food on a plate and place the plate on a weigh scale at a checkout station. The checkout station may determine a total weight and determine a price for the total weight of all the different types of food without accounting for the individual weights of each different type of food on the plate. Since each type of food has its own respective price per pound, generically applying a universal price per pound to the total weight of all the food items may cause the entity to lose money when items on the plate have a lower weight and higher price per pound. Accordingly, entities that use a universal price per pound of food on a plate, regardless of the type of food, are also affected by cost averaging and make not make a profit selling the food. An improvement is desired to determine a total price of a plate of food based on the different prices per pound of each of the different types of food added to the plate.

In other scenarios, some patrons at a buffet-style restaurant may steal the food. The patron may place the food in their pocket, purse, bag, or the like and may leave the establishment operated by the entity selling the food. As a result, the entity selling the food may lose money. An improvement is desired to detect food being stolen and to prevent the theft of the food.

Accordingly, at least some of the example embodiments are directed to a method and system of managing the acquisition of food in a commercial environment. The subject matter may relate to tracking food expenses in restaurants and not only bill patrons correctly but set portion prices that cause reduced loss and increased profit for the restaurant. In addition, the techniques may include a process where the restaurant is able to generate, collect, and transmit data for federally-mandated nutrition reporting. In one example, a patron selects a plate or a bowl, and the selected plate or bowl includes an identification mechanism (e.g., barcode, radio-frequency identification (RFID) chip, or other tracking device).

A buffet may include lines having food stations that are self-serving. Each food station on the buffet line has a food item in a container (e.g., serving dish) resting on a weigh scale at a first location, and each food station further has a tracking mechanism (e.g., barcode reader, near-field communication, or RFID chip read) to identify the plate or bowl and another weigh scale for a plate at a second location. At every point along the way where the user wants food from a food station, the user places the plate on the weigh scale at the second location and the tracking mechanism identifies the plate or bowl. The system records a net weight of the food placed in the plate or bowl. In some examples, the system determines if a removed weight of food from the container matches an added weight of food to the plate before proceeding. "Matching" may refer to the added weight and the removed weight exactly matching or substantially matching within a threshold acceptable range (e.g., from 0 ounces to 0.3 ounces). If the removed weight and added weight do not match, an indication may be presented at the food station. If the removed weight and added weight match, information related to the food may be displayed via a user interface at the food station. The information displayed may be a price of the food per pound determined based on the added weight of the food to the plate, and nutritional facts of the food per pound determined based on the added weight of the food to the plate, and so forth.

The process may be repeated for as many food stations as the user desires. Each time food is added to the plate the price of the added food is determined per pound based on the weight of the added food to the plate and the nutritional facts are determined per pound based on the weight of the added food to the plate. The determined price per pound for each type of food on the plate and/or the nutritional facts per pound for each type of food on the plate may be combined (e.g., summed) and the combined total price and/or nutritional facts may be presented on a user interface at a food station at which the plate is currently located. In some embodiments, the user may wear a tracker, for example, on their wrist, instead of having a tracker on the plate. The information related to the food (e.g., weight of each type of food on the plate, price per pound of each type of food on the plate, nutritional facts per pound of each type of food on the plate, etc.) may be stored on the tracking device on the plate or bowl, on the tracker worn by the user, and/or on a remote server computing device, and the information is used during checkout to determine the overall pricing of the food on the plate that were selected from the food stations.

The granular level of tracking and managing the price of the food by portion size and tracking the weight of the food distributed and retained in inventory may enable an entity selling the food to determine exactly how much profit is made and how much food is left in the inventory. Using historical usage patterns of an amount in weight of food that is consumed over certain time periods (e.g., holidays) may enable the system to predict and recommend having a certain amount in weight of food in the inventory for those time periods in the future. Further, matching the removed weight of the food from the container and the added weight of the food to the plate at a food station may enable detecting scenarios where a user tries to add food from another station to a plate at a first station, a user has placed an item (e.g., cell phone) on the plate, a user is attempting to steal the food, or the like. Additionally, another benefit of the disclosed embodiments may include determining nutritional information for the food on the plate of the user based upon the actual portion serving sizes added to the plate. The disclosed embodiments may be performed without the use of servers or cashiers and may enable a totally self-serving system.

Turning now to the Figures, FIG. 1 shows an overhead view of a buffet-style restaurant using an example system 100 in accordance with various embodiments. As depicted, the buffet-style restaurant may include a check-in station 110, numerous food stations 120 (e.g., 120-1 through 120-8), and a checkout station 130. A user 102 may arrive at the restaurant and approach the check-in station 110 where the user 102 may obtain a plate 104. The user may wear an identification mechanism (e.g., a key fob, wearable, etc.) and/or the plate 104 may include the identification mechanism (e.g., barcode, RFID chip, or other tracking device). A tracking mechanism (e.g., a reader) may be used to read an identifier of the identification mechanism to track which plate 104 the user 102 selected. In some embodiments, the user may provide identifying information and/or payment information to a computing device at the check-in station 110. For example, the user may provide a driver's license and/or a credit card to the computing device and the identifying information and/or payment information may be correlated to the identifier of the identification mechanism of the plate 104 selected by the user 102. The user may also enter their name on a user interface presented at the computing device at the check-in station 110 that is correlated to the identifier of the identification mechanism of the plate 104.

Each of the food stations 120 may include two locations 122 (e.g., 122-1 through 122-8) and 124 (e.g., 124-1 through 124-8), each having a respective weigh scale. Each first location 122 may include a weigh scale that may be disposed above a heating source or cooling source and/or behind a sneeze guard, for example. Containers containing food may be disposed on the weigh scale at each first location 122 and the weigh scale may measure the weight of the container containing the food. An initial container weight may be obtained when the container containing food is initially placed on the weigh scale. In some embodiments, for foods that are particularly adhesive, the initial container weight may include the weight of a serving utensil that is disposed partially in the food in the container. In this embodiment, the weight of the serving utensil may be accounted for when removed and placed back in the container such that a net weight of food that left the container is determined.

Each second location 124 may include a weigh scale installed in or located on top of a tabletop and the weigh scale may measure a weight of a plate disposed on the weigh scale. Each second location 124 may also include a tracking mechanism (e.g., barcode reader, near-field communication, or RFID chip reader) that obtains (e.g., reads, scans, etc.) an identifier of the identification mechanism of the plate 104 or the user 102. The identifier may be used to correlate the weight of different types of food that are added to the plate 104 to enable accurate management of food acquired on the plate 104 by the user 102. Further, each second location 124 may also include a locking mechanism to secure the plate in place on the weigh scale, and/or a guiding mechanism that guides the plate 104 into a proper position to align the identification mechanism of the plate 104 with the tracking mechanism of the reader at the second location 124. In some embodiments, the guiding mechanism may be pins that protrude around the weigh scale and the shape of the plate 104 may be such that the plate 104 fits within the pins in a single position. In some embodiments, the guiding mechanism may include an arrow and/or text on the plate that indicates pointing the plate 104 away from the user 102 or pointing the arrow toward the tracking mechanism.

The weigh scale may provide continuous, near continuous, or periodic weight measurements to a server computing device. The server computing device may track the weight of the type of food contained in the container at each first location 122, and may receive a signal from the weigh scale when a weight of the container containing food has satisfied a threshold condition (e.g., a minimally accepted weight). As a result, an indication may be provided at the food station 120 to fill the container with more food and/or a signal may be transmitted to the server computing device to fill the container with more food. In some embodiments, each first location 122 may include a lid to cover the container and a lock mechanism may be used to secure the lid locked in a closed position or opened position. For example, in some embodiments, the lock mechanism may secure the lid in a closed position so the user may not access the food in the container until the plate 104 is secured in place or placed in a proper orientation at the second location 124. The lock mechanism may transition to an unlocked state and the container may be actuated to an opened position (either automatically or manually) when the lock mechanism is in the unlocked state. A light, which was previously emitting one color indicating the food station is available to serve food, may change to another color indicating the lid is open and the food station is currently occupied. When the user has put food on their plate and the check of whether the added weight of the food to plate matches a removed weight of the food from the container, the lid may actuate to the closed position and the locking mechanism may transition to a locked state to secure the lid. Further, the light may transition back to the color indicating that the food station is available to serve food.

Each food station 120 may include an alarm that is activated when various scenarios are detected or occur. For example, the alarm may be activated when food from a different food station (e.g., 120-2) is detected on a plate 104 that is located at a first station (e.g., 120-1), when an item is detected as being added the plate 104 at a second location 124 of a food station 120 when there is no corresponding removed weight from the first location 122 of that food station 120, when a removed weight of food is detected from a first location 122 but no corresponding added weight of food to the plate 104 is detected at the second location 124 (e.g., a user has placed the food elsewhere, such as their purse or bag), when food in a container at the first location 122 is below a threshold weight, and the like.

As the user 102 walks around the various food stations 120 adding food to the plate 104, the system 100 may track the weight of each type of food added from the respective food stations 120. Further, the system 100 may determine the price of the food per pound for each type of food added to the plate 104 based on the added weight of that type of food. Also, the system 100 may determine the nutritional facts of the food per pound for each type of food added to the plate 104 based on the added weight of that type of food. The system 100 can combine the individual prices per pound of each type of food to determine a total price of the various foods on the plate 104 and can combine the individual nutritional facts per pound of each type of food to determine total nutritional facts of the various foods on the plate.

When the user is satisfied with the food on the plate 104, the user 102 may proceed to the checkout station 130. The checkout station 130 may include a computing device with a display and a tracking mechanism. The tracking mechanism may determine, based on the identification mechanism, the identifier of the plate 104 and/or the user 102 and may send the identifier to the server computing device. The server computing device may send the total price of the food on the plate 104, the total weight of the food on the plate 104, and/or the total nutritional facts of the food on the plate 104 to be presented on the display of the computing device. The computing device may include a credit card reader and/or cash accepting device to enable the user 102 to pay the price that is displayed. When the payment is accepted, an indication may be presented on the user 102 may proceed to a dining area or any other suitable area.

Figure 2:
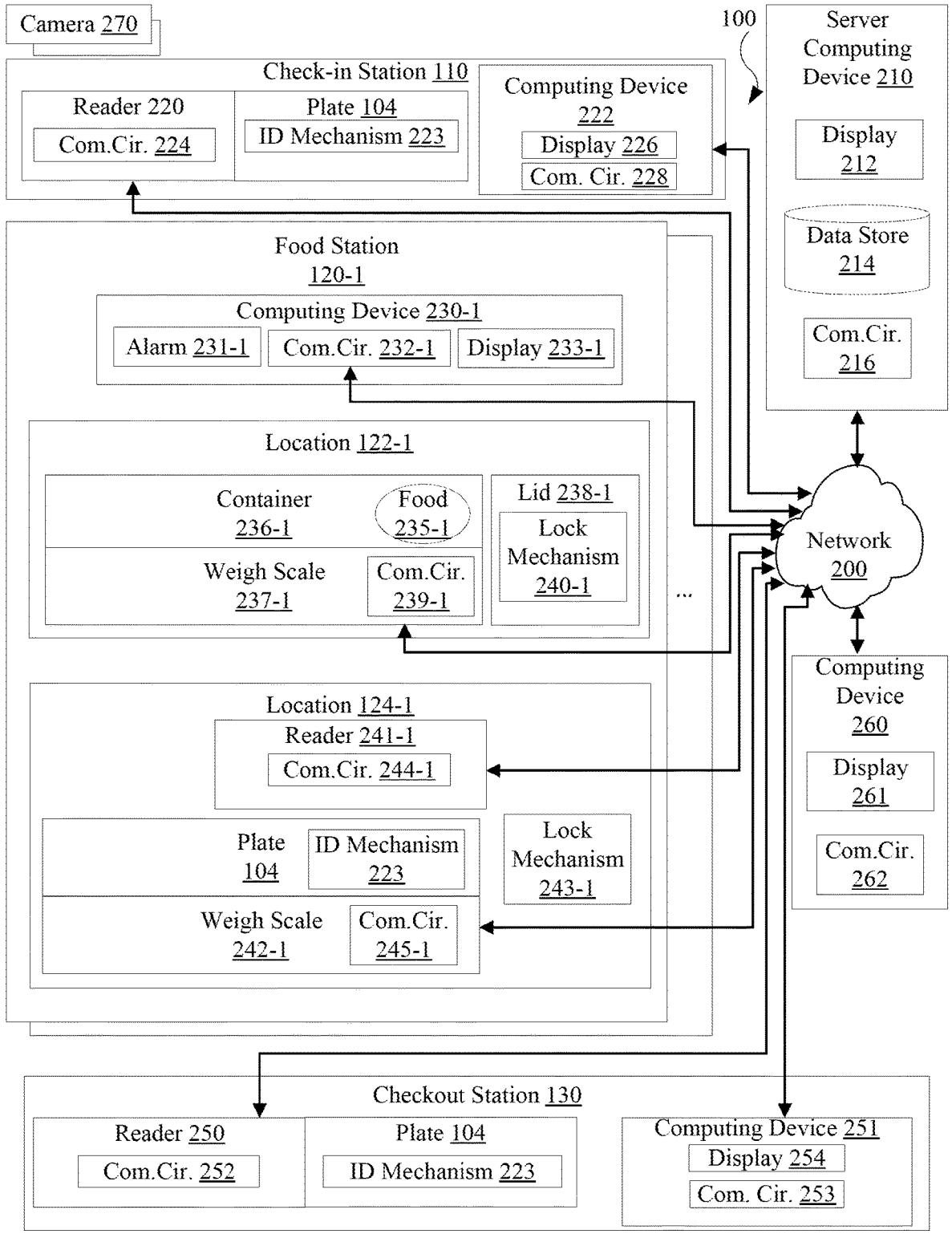
FIG. 2 shows an example component diagram of the system in accordance with various embodiments.

FIG. 2 shows an example component diagram of the system 100 in accordance with various embodiments. The components in the system 100 are arranged in an initial state before a user obtains the plate 104 and adds food to the plate 104 at the various food stations 120. As depicted, the system 100 includes a network 200 to which various components of the check-in station 110, various components of the food stations 120 (e.g., 120-1 through 120-8), various components of the checkout station 130, a server computing device 210, a computing device 260, and/or a camera 270 (connection not shown) are connected. The network 200 may include a public network (e.g., connected to the Internet via wired (Ethernet) or wireless (WiFi)), a private network (e.g., a local area network (LAN) or wide area network (WAN)), or a combination thereof. The various electronic devices may transmit data to and receive data from each other via the network 200.

The system 100 includes the server computing device 210. Although one server computing device 210 is depicted, numerous server computing devices 210 may be included in the system 100 and communicably coupled with each other via the network 200. Each of the servers 210 may include one or more displays 212, processing devices, memory devices, data stores 214, and/or communication circuitry 216. The data store 214 may store an inventory of food owned by the restaurant. For example, the inventory of food may include each type of food and the weight of the food (e.g., in pounds, ounces, etc.) that is owned by the restaurant. The inventory may specify the weight of the food that is stored in each portion of the restaurant (e.g., freezer(s), refrigerator(s), pantry(ies), cabinet(s), etc.). The data store 214 may also store the number of different food stations 120 that are provided at any given time, the type of food being served in containers at those food stations, the current weight of the food that is contained in the containers at any given time, a minimum acceptable weight for each type of food at each container, and so forth. In addition, the data store 214 may store an association of an identifier of a plate 104, each type of food added to the plate 104, the weight of each type of food that is added to the plate 104, a price per pound of each type of food added to the plate 104, the nutritional facts per pound of each type of food added to the plate 104, a total price per pound of the cumulative food added to the plate 104, and/or total nutritional facts per pound of the cumulative food added to the plate 104.

The system 100 includes the check-in station 110. The check-in station 100 includes various components, such as a reader 220, the plate 104, and/or the computing device 222. The reader 220 may be a tracking mechanism (not shown) that includes a scanner (e.g., barcode, serial number, etc.), a radio-frequency identification (RFID) reader, or the like. The reader 220 may be any suitable reader that is capable of obtaining an identifier of an identification mechanism 223 of the plate 104. To that end, the identification may be any suitable identification mechanism 223 that is capable of including an identifier and being read by the reader 220. The identification mechanism 223 may be disposed on a bottom side of the plate 104 to enable the identification mechanism 223 to be read when the plate 104 is placed on a weigh scale. In some embodiments, the reader 220 may also include a mechanism to read magnetic stripes of an identification card (e.g., driver license) of the user or a payment card (e.g., debit, credit, etc.) of the user.

The reader 220 may further include communication circuitry 224 that enables communicating data with other electronic devices over the network 200. For example, the communication circuitry 224 may include a network interface that enables communication via a wireless protocol for transmitting data over short distances, such as Bluetooth, ZigBee, etc. and/or a wireless protocol for communicating data over long distances, such as WiFi. The reader 220 may include a processing device and/or memory device, as well as any other suitable component.

When the user obtains a plate 104 at the check-in station 110, the user may place the plate 104 near the reader 220 such that the identifier is read and sent to the server computing device 210 over the network 200 by the communication circuitry 214. Further, the reader 220 may be used to swipe an identification card or a payment card of the user, and personal identifying information may be transmitted to the server computing device 210 to be correlated with the identifier of the plate 104.

The computing device 222 includes a display 226 and communication circuitry 228. The computing device 222 may also include a processing device and/or memory device, as well as any other suitable component. The communication circuitry 228 may include a network interface and enable communicating data with other electronic devices over the network 200. The display 226 may present a user interface that displays one or more indications, alerts, messages, notifications, or the like. For example, the user interface on the display 226 may present graphical elements (e.g., input boxes, text fields, etc.) that enable a user to enter personal information (e.g., name, username, email address, number of guests, and so forth) using an input device, such as a keyboard, mouse, touchscreen, etc. The personal information may be transmitted via the communication circuitry 228 to the server computing device 210 via the network 200. The server computing device 210 may associate the identifier of the plate 104 with the personal information of the user.

Once the user has obtained the plate 104, the user may proceed to a first food station 120-1. Each of the food stations 120 may include similar components. The food station 120-1 may include a computing device 230-1, a first location 122-1, and a second location 124-1. The computing device 230-1 may include an alarm 231-1, communication circuitry 232-1, a display 233-1, a processing device, a memory device, and/or any other suitable components. The communication circuitry 232-1 may include a network interface and enable communicating data with other electronic devices over the network 200. The alarm 231-1 may include a light capable of emitting various colors of light based on the type of alert, a speaker capable of emitting various audible sounds based on the type of alert, or some combination thereof. For example, the alarm 231-1 may be activated (e.g., flash a color of light, make an audible sound, or both) when it is determined that first food 235-1 in a first container 236-1 at the first location 122-1 is below a threshold minimum allowable amount to enable an employee to add food to the first container 236-1. The alarm 231-1 may be activated when it is determined that an item besides food has been added to the plate 104, when food from another food station has been added to the plate 104 at the first food station 120-1, and so forth.

The display 233-1 may present a user interface that displays one or more indications, alerts, messages, notifications, summaries, or the like. For example, the user interface on the display 233-1 may present various information, such as the type of food being served at the food station 120-1, a weight of food that is added to the plate 104, a price of each type of food (per pound) added to the plate 104, nutritional facts of each type of food (per pound) added to the plate, a total price of cumulative types of food added to the plate, and/or total nutritional facts of cumulative types of food added to the plate. Also, the user interface on the display 233-1 may provide an alert or notification to the user to remove a detected item that is not food from the plate 104. The alert or notification may indicate that the added weight of first food 235-1 to the plate 104 does not match the removed weight of first food 235-1 from the first container 236-1. The information presented on the display 233-1 may be received from the server computing device 210 over the network 200 via the communication circuitry 232-1.

The first location 124-1 includes the first container 236-1 containing the first food 235-1, a first weigh scale 237-1, and/or a lid 238-1. The first container 236-1 may be any suitable container (e.g., bin, tub, bowl, platter, etc.) that is capable of containing first food 235-1 and may be made of any suitable material (e.g., plastic, glass, metal, etc.).

The first container 236-1 may be disposed on the first weigh scale 237-1. The first weigh scale 237-1 may be any suitable weigh scale capable of measuring a weight of the container 236-1. The first weigh scale 237-1 may include a processing device and/or a memory device. The first weigh scale 237-1 may be a precision scale that provides one or more digital readouts via a light emitting diode display (not shown). The first weigh scale 237-1 may include materials that render the first weigh scale 237-1 waterproof, temperature (e.g., hot, cold) resistant, or some combination thereof. The first weigh scale 237-1 may be disposed above a heat source (e.g., stove, boiling water, etc.) or a cold source (e.g., ice). The first weigh scale 237-1 may include communication circuitry 239-1. The communication circuitry 239-1 may include a network interface and enable communicating data with other electronic devices over the network 200. For example, the first weigh scale 237-1 may transmit measured weights of the container 236-1 to the server computing device 210 over the network 200 via the communication circuitry 239-1.

The lid 238-1 may be a mechanical lid that is actuated to an opened position and closed position by a user or an electromechanical lid that is automatically actuated to an opened position and closed position using an actuator, controller, or the like. The lid 238-1 may be made of any suitable material (e.g., plastic, metal, glass, etc.). The lid 238-1 may include a lock mechanism 240-1 that is capable of locking the lid 238-1 in the opened position or the closed position. The lock mechanism 240-1 may transition between a locked state and an unlocked state. The lock mechanism 240-1 may be a hinge and latch type of lock mechanism 240-1. The lock mechanism 240-1 may be electronically actuated to transition between the locked state and the unlocked state.

The second location 124-1 includes a reader 241-1, a second weigh scale 242-1, and a lock mechanism 243-1. The reader 241-1 may be any suitable tracking mechanism that is capable of reading the ID mechanism 223 to determine the identifier of the plate 104 when the plate 104 is placed proximate or relative to the reader 241-1 (e.g., when the plate is disposed on the second weigh scale 242-1). For example the reader 241-1 may be a scanning device (e.g., barcodes, serial numbers), a RFID reader, a magnetic strip reader, a chip reader, etc. The reader 241-1 may include communication circuitry 244-1. The communication circuitry 244-1 may include a network interface and enable communicating data with other electronic devices over the network 200. For example, the reader 241-1 may read the ID mechanism 223 to determine the identifier of the plate 104 and transmit the identifier of the plate 104 to the server computing device 210 over the network 200 via the communication circuitry 244-1.

When the user arrives at the first food station 120-1, the user may place the plate 104 on the second weigh scale 242-1. There may be guiderails that assist placing the plate in the proper position relative to the reader 241-1 to enable the ID mechanism 223 to be read and/or the plate 104 to be properly positioned on the second weigh scale 242-1. Also, an indicator (e.g., arrow) may be placed on the plate that specifies pointing the arrow toward the reader 241-1, away from the body of the user, or a combination thereof, to enable the plate 104 to be properly positioned relative to the reader 241-1 and/or on the second weigh scale 242-1.

The plate 104 may be disposed on the second weigh scale 242-1. The second weigh scale 242-1 may be any suitable weigh scale capable of measuring a weight of the plate 104. The second weigh scale 242-1 may include a processing device and/or a memory device. The second weigh scale 242-1 may be a precision scale that provides one or more digital readouts via a light emitting diode display (not shown). The second weigh scale 242-1 may include materials that render the second weigh scale 242-1 waterproof, temperature (e.g., hot, cold) resistant, or some combination thereof. The second weigh scale 242-1 may include communication circuitry 245-1. The communication circuitry 245-1 may include a network interface and enable communicating data with other electronic devices over the network 200. For example, the second weigh scale 245-1 may transmit measured weights of the plate 104 to the server computing device 210 over the network 200 via the communication circuitry 245-1.

The lock mechanism 243-1 may be electrically actuated to secure the plate 104 in place. For example, when it is determined that the plate 104 is properly positioned on the second weigh scale 242-1, before first food 235-1 has been added to the plate 104, the lock mechanism 243-1 may transition from an unlocked state to a locked state to secure the plate 104 in place. The lock mechanism 243-1 may be pins that latch onto the plate 104, for example. When the plate 104 is secured with the lock mechanism 243-1, the lock mechanism 240-1 for the lid 238-1 may transition from a locked state to an unlocked state and the lid 238-1 may be automatically actuated from a closed position to the opened position. Further, the alarm 231-1 and/or display 233-1 of the computing device 230-1 may indicate that the food station 120-1 is currently in use and is unavailable.

The user may add first food 235-1 from the container 236-1 to the plate 104 disposed on the second weigh scale 242-1. A determination may be made (e.g., by the server computing device 210, or the computing device 230-1 of the food station 120-1) whether the removed weight of the first food 235-1 from the first container 236-1 matches the added weight of the first food 235-1 to the plate 104. If the added weight and removed weight of the first food 235-1 match, certain information may be presented on the display 233-1 of the computing device 230-1. Such a scenario and other scenarios are depicted further below in the examples depicted in FIGS. 3A-3C, and 4-6. Further, if the added weight and the removed weight of the first food 235-1 match, the user may press a button to indicate that the user is done adding food. The lock mechanism 243-1 may transition from the locked state to the unlocked state to release the plate 104. Further, the lid 238-1 may actuate from the opened position to the closed position and the lock mechanism 238-1 may transition from an unlocked state to the locked state. Further, the alarm 231-1 and/or display 233-1 of the computing device 230-1 may indicate that the food station 120-1 is currently available for serving food.

When the user has added a desired amount of food to the plate 104, the user may proceed to the checkout station 130. The checkout station 130 includes a reader 250 and a computing device 251. The reader 250 may be any suitable tracking mechanism that is capable of reading the ID mechanism 223 to determine the identifier of the plate 104 when the plate 104 is placed proximate or relative to the reader 250. For example the reader 250 may be a scanning device (e.g., barcodes, serial numbers), a RFID reader, a magnetic strip reader, a chip reader, etc. The reader 250 may include communication circuitry 252. The communication circuitry 252 may include a network interface and enable communicating data with other electronic devices over the network 200. For example, the reader 252 may read the ID mechanism 223 to determine the identifier of the plate 104 and transmit the identifier of the plate 104 to the server computing device 210 over the network 200 via the communication circuitry 252.

The server computing device 210 may receive the identifier and retrieve information associated with the identifier from the data store 214. The information may include a price of each food on the plate 104 per pound, nutritional facts related to each type of food on the plate 104 per pound, a total price of the food on the plate 104, and/or total nutritional facts of the food on the plate 104. The server computing device 210 may transmit the information the computing device 251.

To that end, the computing device 251 may include communication circuitry 253. The communication circuitry 253 may include a network interface and enable communicating data with other electronic devices over the network 200. For example, the communication circuitry 253 may receive the information sent from the server computing device 210. The computing device 251 may also include a display 254 that presents the information, in some embodiments. The computing device 251 may also include a processing device, a memory device, and/or any other suitable component. The computing device 251 may include or be attached to a payment system, such as a credit card reader, chip reader, cash receiver, or the like. The user may pay for the food, and when it is determined that the payment has processed successfully, the display 254 may present an indication that payment has been accepted and the user may proceed to the dining area or leave.

An employee may use the computing device 260 to facilitate management of the restaurant. For example, the employee may use the computing device to provide instructions to the server computing device 210, the computing device 222, the computing device 230, and/or the computing device 251. In some embodiments, the computing device 260 may include a smartphone, tablet, laptop, desktop, or the like. The computing device 260 may include a display 261 and communication circuitry 262. The communication circuitry 262 may include a network interface and enable communicating data with other electronic devices over the network 200. For example, the communication circuitry 262 may receive information from the server computing device 210. The information may relate to the inventory of food that is owned by the restaurant, to the types of food being served at each food station, the amount of food (e.g., weight) currently contained in each container 236 of the food stations 120, an amount of money the restaurant has made for any suitable time period, and so forth. The information may be displayed on a user interface of the display 261.

The camera 270 may be any suitable camera capable of obtaining video or image data. The camera 270 may provide the video and/or image data to the server computing device 210. The video and/or image data may be used when alarm 231 is activated to determine where missing weights of food went when there is removed weight of food from the containers 326 with no corresponding added weight of the food to a plate 104. The video and/or image data may be used to identify the users that are acquiring food at the food stations 120, and so forth.

Figure 3A:
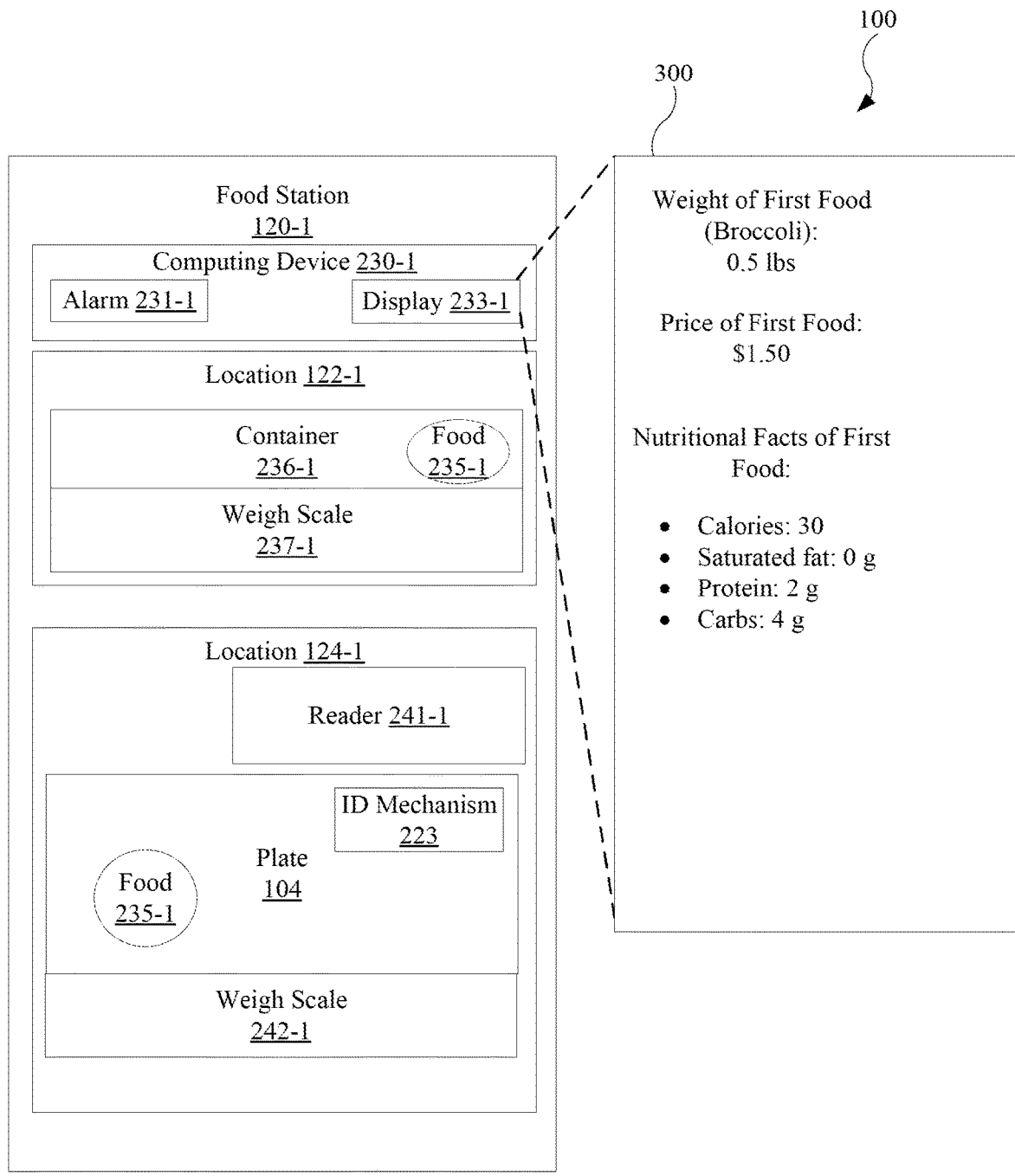
FIGS. 3A-3C show an example acquisition of food from a first and second food station using the system in accordance with various embodiments.
Figure 3B:
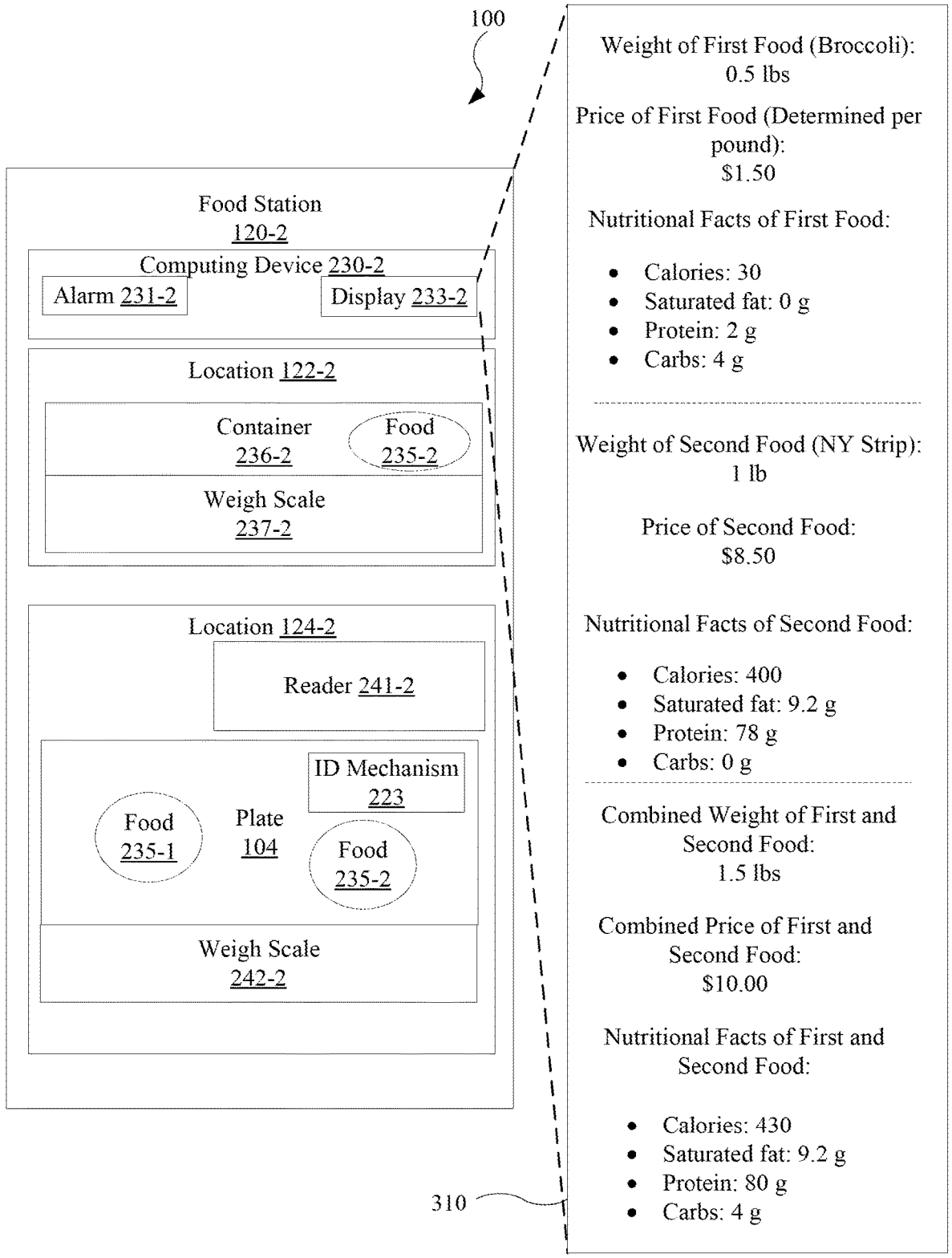
Figure 3C:
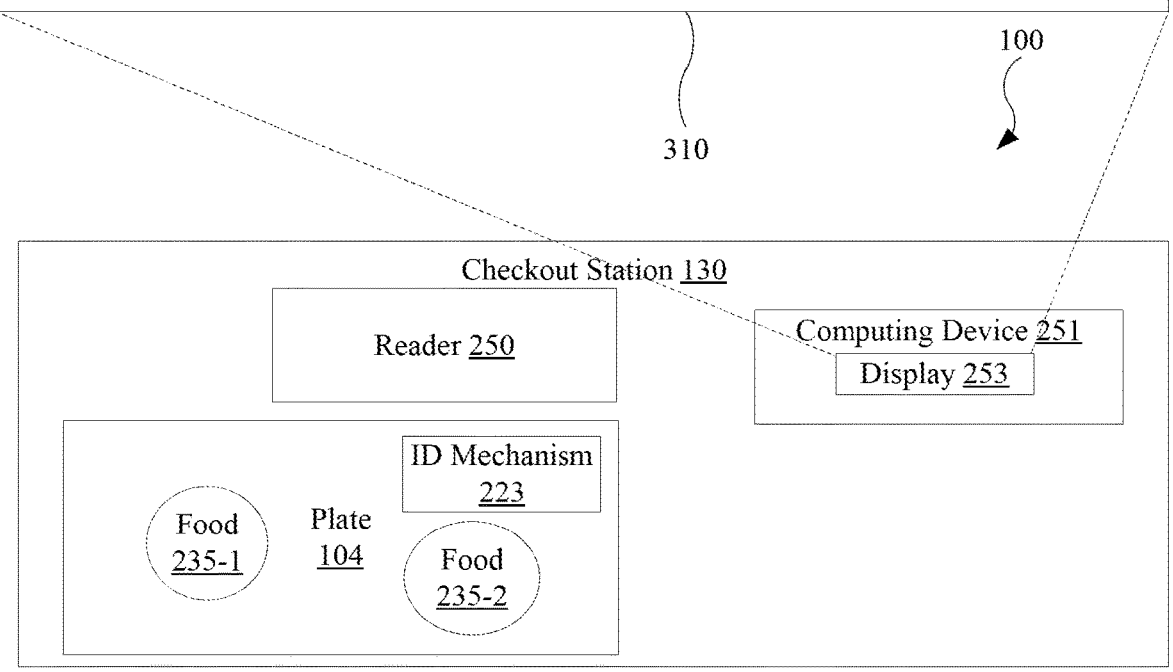

FIGS. 3A-3C show an example acquisition of food from a first food station 120-1 and a second food station 120-2 using the system 100 in accordance with various embodiments. As depicted in FIG. 3A, the first food station 120-1 includes the first container 236-1 containing the first food 235-1, and the first container 236-1 is disposed on the first weigh scale 237-1. A processing device (e.g., of the server computing device 210) may obtain an initial container weight of the first container 236-1 when the first container 236-1 including the first food 235-1 is initially disposed on the first weigh scale 237-1. The initial container weight may be stored in the data store 214 of the server computing device 210.

The user may place the plate 104 on the second weigh scale 242-1. The reader 241-1 may read the ID mechanism 223 on the plate 104 to determine the identifier of the plate 104. The reader 241-1 may transmit the identifier to the processing device. The second weigh scale 242-1 may measure the weight of the plate 104 prior to any of the first food 235-1 being added to the plate 104. The user may use a serving utensil to remove the first food 235-1 from the first container 236-1 and add the first food 235-1 to the plate 104. The first weigh scale 237-1 may measure the first container 236-1 after the first food 235-1 is removed and send the measured weight to the processing device. The processing device may determine the removed weight of the first food relative to the initial container weight. The second weigh scale 242-1 may measure the plate 104 after the first food 235-1 is added and send the measured weight to the processing device. The processing device may determine the added weight of the first food 235-1 to the plate 104 using the measured weight relative to the initial weight of the plate 104.

The processing device may determine if the removed weight and the added weight match. If the removed weight and the added weight match, the processing device sends information 300 to be displayed on the display 233-1 at the computing device 230-1 of the first food station 120-1. The information 300 may include a price of the first food 235-1 determined per pound based on the added weight of the first food 235-1. An employee of the restaurant may set the price per pound on the server computing device 210. The processing device may use the price of the food item per pound to determine the price of the first food 235-1 added to the plate 104 in view of the added weight of the first food 235-1. The information 300 may also include nutritional facts of the first food 235-1 determined per pound of the first food 235-1. The processing device may access federally administered nutritional facts from a database of another computing device to determine the nutritional facts of the first food 235-1 added to the plate 104. The information 300 may also include the added weight of the first food 235-1 that is added to the plate 104.

As depicted, the first food 235-1 added to the plate 104 is broccoli. The information 300 displayed on the display 233-1 includes the weight of the broccoli (0.5 lbs), the price of the broccoli ($1.50), and the nutritional facts of the broccoli (calories: 30, saturated fat: 0 grams (g), protein: 2 g, carbs: 4 g). The price of the broccoli may be determined per pound (e.g., if the price of broccoli is $3 per pound, and the user adds 0.5 pounds of broccoli to their plate, then the price of the added broccoli is $1.50) The information 300 may be associated with the identifier of the plate 104 and/or personal information of the user and stored in the data store 214.

When the user is done adding the first food 235-1 to the plate 104, the user may move the plate 104 to the second food station 120-2, as depicted in FIG. 3B. In FIG. 3B, the second food station 120-2 includes a second container 236-2 containing second food 235-2, and the second container 236-2 is disposed on a third weigh scale 237-1. A processing device (e.g., of the server computing device 210) may obtain another initial container weight of the second container 236-2 when the second container 236-2 including the second food 235-2 is initially disposed on the third weigh scale 237-2. The another initial container weight may be stored in the data store 214 of the server computing device 210.

The user may place the plate 104 on a fourth weigh scale 242-2 at the second food station 120-2. The reader 241-2 may read the ID mechanism 223 on the plate 104 to determine the identifier of the plate 104. The reader 241-2 may transmit the identifier to the processing device. The fourth weigh scale 242-1 may measure the weight of the plate 104 prior to any of the second food 235-2 being added to the plate 104. The user may use a serving utensil to remove the second food 235-2 from the second container 236-2 and add the second food 235-2 to the plate 104. The third weigh scale 237-2 may measure the second container 236-2 after the second food 235-2 is removed and send the measured weight to the processing device. The processing device may determine the removed weight of the second food 235-2 relative to the initial container weight. The fourth weigh scale 242-2 may measure the plate 104 after the second food 235-2 is added and send the measured weight to the processing device. The processing device may determine the added weight of the second food 235-2 to the plate 104 using the measured weight relative to the initial weight of the plate 104.

The processing device may determine if the removed weight and the added weight match. If the removed weight and the added weight match, the processing device sends information 310 to be displayed on the display 233-2 at the computing device 230-2 of the first food station 120-2. The information 310 may include a price of the first food 235-1 based on the added weight of the first food 235-1, nutritional facts of the first food 235-1 of the first food 235-1, and the added weight of the first 235-1 that is added to the plate 104. The information 310 may also include a price of the second food 235-2 based on the added weight of the second food 235-2, nutritional facts of the second food 235-2 of the second food 235-2, and the added weight of the second food 235-2 that is added to the plate 104. Further, the information 310 may also include a total price for the first food 235-1 and second food 235-2, total nutritional facts of the first food 235-1 and second food 235-2, and a combined weight of the first food 235-1 and second food 235-2 that are added to the plate 104.

As depicted, the first food 235-1 added to the plate 104 is broccoli. The information 310 displayed on the display 233-2 includes the weight of the broccoli (0.5 lbs), the price of the broccoli ($1.50), and the nutritional facts of the broccoli (calories: 30, saturated fat: 0 grams (g), protein: 2 g, carbs: 4 g). The information 300 may be associated with the identifier of the plate 104 and/or personal information of the user and stored in the data store 214.

The second food 235-2 added to the plate 104 is New York strip steak (NY strip). The information 310 displayed on the display 233-2 includes the weight of the NY strip (1 lb), the price of the NY strip ($8.50), and the nutritional facts of the NY strip (calories: 400, saturated fat: 9.2 grams (g), protein: 78 g, carbs: 0 g). The information 310 may be associated with the identifier of the plate 104 and/or personal information of the user and stored in the data store 214.

The information 310 also includes the combined total price and nutritional facts. For example, the combined weight of the first and second food (1.5 lbs) is displayed, the combined price of the first and second food ($10) is displayed, and the combined nutritional facts determined for each item (calories: 430, saturated fat: 9.2 grams (g), protein: 80 g, carbs: 4 g) is displayed.

After the user has the desired amount of food on the plate 104, the user may proceed to the checkout station 130, as depicted in FIG. 3C. The user may place the plate 104 including the first food 235-1 and the second food 235-2 relative to or near the reader 250. The reader 250 may read the ID mechanism 223 to determine the identifier of the plate 104 and transmit the identifier to the processing device of the server computing device 210. The server computing device 210 may use the identifier to obtain information 310 associated with the identifier from the data store 214 and send the information to the computing device 251 of the checkout station 130. The computing device 251 may present the information 310 on the display 253. The user may pay the total price. In some instances, a receipt including the information 310 may be printed that includes the pricing and nutritional facts of the first and second foods.

Figure 4:
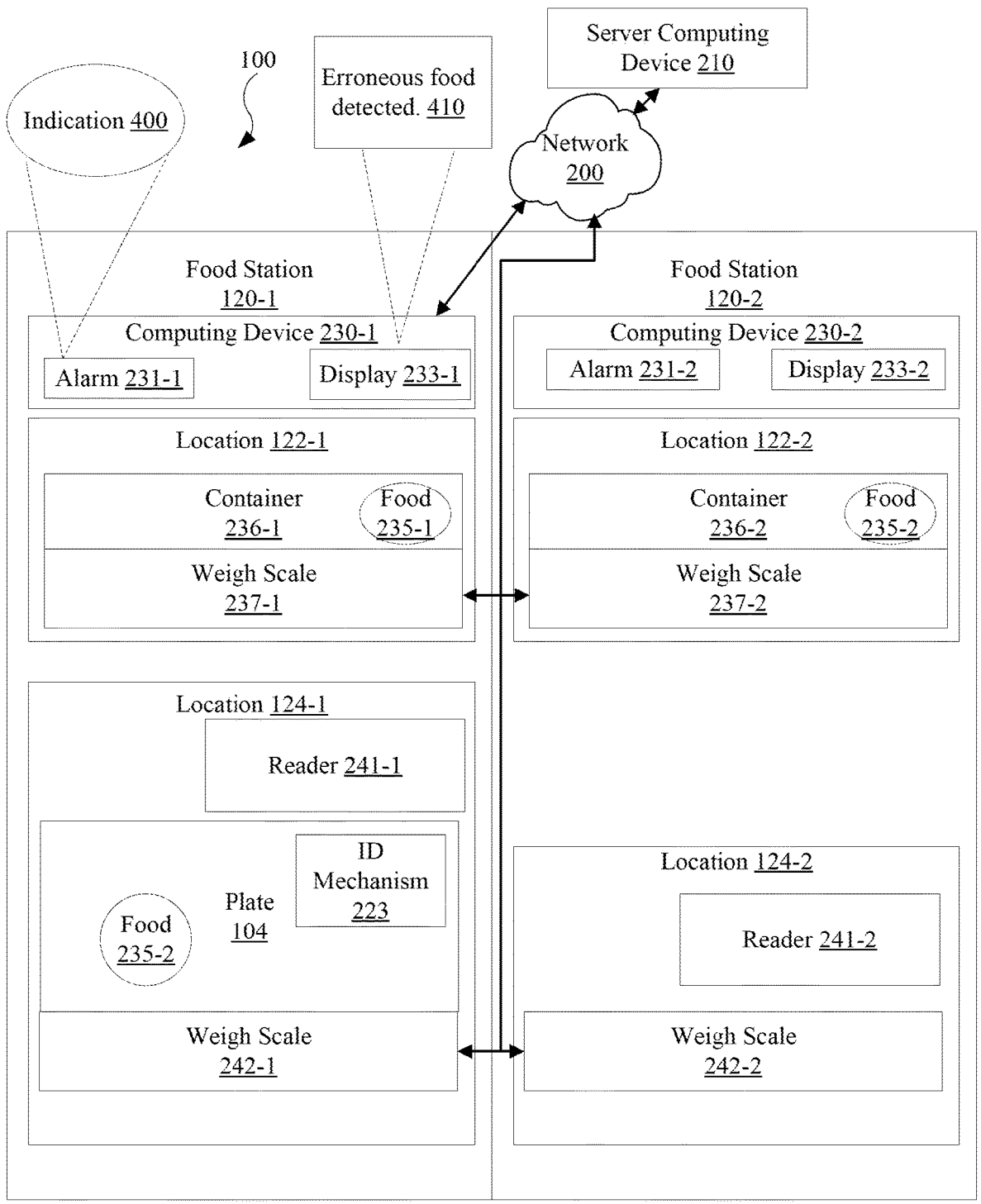
FIG. 4 shows an example of detecting food from one food station being erroneously placed on a plate at a different food station in accordance with various embodiments.

FIG. 4 shows an example of detecting food from one food station 120-2 being erroneously placed on a plate 104 at a different food station 102-1 in accordance with various embodiments. The first container 236-1 including first food 235-1 is disposed on the first weigh scale 237-1. The initial weight of the first container 236-1 including the first food 235-1 is stored at the server computing device 210. The second container 236-2 including second food 235-2 is disposed on the third weigh scale 237-2. The initial weight of the second container 236-2 including the second food 235-2 is stored at the server computing device 210. The user has placed the plate 104 on the second weigh scale 242-1 of the first food station 102-1. The initial weight of the plate 104 may be determined at stored at the server computing device 210. There is nothing placed on the fourth weigh scale 242-2 of the second food station 120-2 so its initial weight measurement is zero, which is stored at the server computing device 210.

In the depicted example, the user has removed second food 235-2 from the second container 236-2 and added the second food 235-2 to the plate 104. In some embodiments, the second weigh scale 242-1 may transmit the added weight of the second food 235-2 to the plate 104 to the server computing device 210 via the network 200 after the second food 235-2 is added to the plate 104. The third weigh scale 237-2 may transmit the weight of the second container 236-2 to the server computing device 210 via the network 200 after the second food 235-2 is removed. The server computing device 210 may determine that the weight of the second food 235-2 removed from the second container 236-2 at the second food station 120-2 matches the weight of the second food 235-2 added to the plate 104 at the first food station 120-1. The server computing device 210 may also determine whether there is any removed weight of first food 235-1 from the first container 236-1. If the weight of the first container 236-1 is the same before and after the second food 235-2 is added to the plate 104 and the added weight of the second food 235-2 to the plate 104 matches the removed weight of the second food 235-2 removed from the second container 236-2, the server computing device 210 may send a signal to the computing device 230-1 that there is a problem. The computing device 230-1 may activate the alarm 231-1 to provide an indication 400 that the user is attempting to add food from another station to the plate 104. Further, the computing device 230-1 may display a message 410 that indicates there is a problem (e.g., "Erroneous food detected").

In another embodiment, the server computing device 210 may determine that a corresponding added weight is not accounted for by a weight measurement from the fourth weigh scale 242-2 within a threshold amount of time. If this determination is made, the server computing device 210 may send a signal to the computing device 230-1 that there is a problem, as described above.

Figure 5:
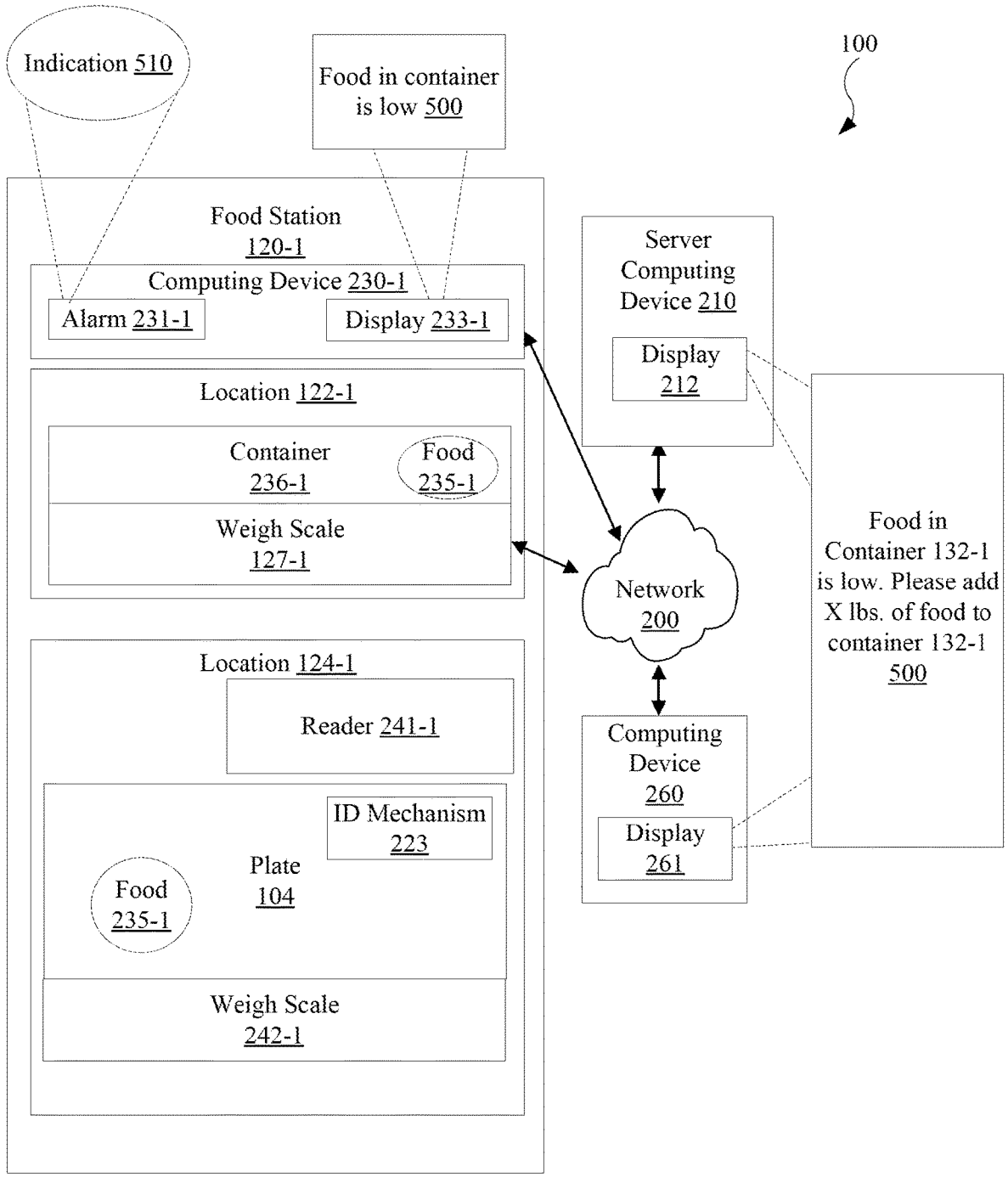
FIG. 5 shows an example of detecting when food in a container is low in accordance with various embodiments.
Figure 6:
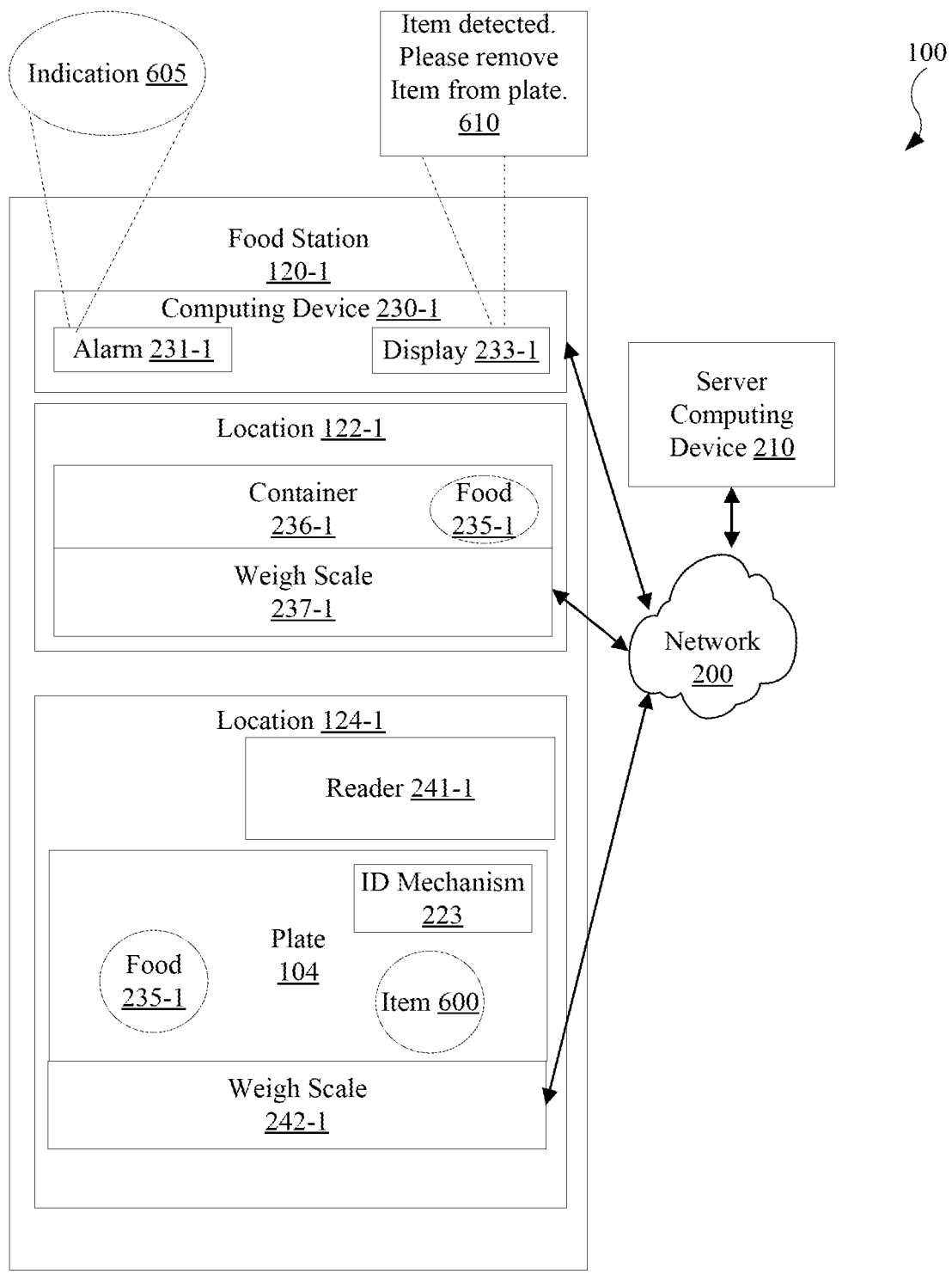
FIG. 6 shows an example of detecting when an item is improperly placed on a plate in accordance with various embodiments.

FIG. 5 shows an example of detecting when food in a first container 236-1 is low in accordance with various embodiments. As depicted, the first container 236-1 including the first food 235-1 is disposed on the first weigh scale 127-1. The plate 104 is disposed on the second weigh scale 242-1. The user may remove the first food 235-1 from the first container 236-1 and add the first food 235-1 to the plate 104. The first weigh scale 127-1 may measure the weight of the first container 236-1 after the first food 235-1 is removed and transmit the weight to the server computing device 210 via the network 200. The server computing device 210 may determine that the weight of the first container 236-1 satisfies a threshold condition. The threshold condition may be a minimum accepted weight of the food in the first container 236-1. Responsive to determining that the container weight satisfies the threshold condition, the server computing device 210 may transmit a notification to the computing device 230-1 of the first food station 120-1 and/or to the computing device 260. The display 233-1, 212, and/or 261 may present a message 500 (e.g., "Food in container 236-1 is low. Please add X lbs. of food the container 236-1" where X is any suitable number) based on the notification. Further, the notification may cause the alarm 231-1 to activate at the first food station 120-1 and provide an indication 510 representing that the food in the first container 236-1 is low. The computing FIG. 6 shows an example of detecting when an item 600 is improperly placed on a plate 104 in accordance with various embodiments. The plate 104 is placed on the second weigh scale 242-1 at the first food station 120-1. An initial weight of the plate 104 is determined when the plate 104 is placed on the weigh scale 242-1. The user has removed first food 235-1 from the first container 236-1 and added first food 235-1 to the plate 104. The system 100 has determined that the added weight of the first food 235-1 to the plate 104 matches the removed weight of the first food 235-1 from the first container 236-1. Then, the user may place an item (e.g., a smartphone, keys) on the plate 104. The second weigh scale 242-1 may measure the weight of the plate 104 with the added item and transmit the weight to the server computing device 210. The server computing device 210 may determine that there is no additional removed weight of the first food 235-1 from the first container 236-1 because the weight of the first container 236-1 remained the same after the item 600 is added to the plate 104. This discrepancy may cause the server computing device 210 to transmit a signal to the computing device 230-1 of the first food station 120-1 that there is a problem. The computing device 230-1 may activate the alarm 231-1 to provide an indication 605 that an item has been detected on the plate 104. Further, the computing device 230-1 may display a message 610 that indicates there is a problem (e.g., "Item detected. Please remove item from plate").

Figure 7:
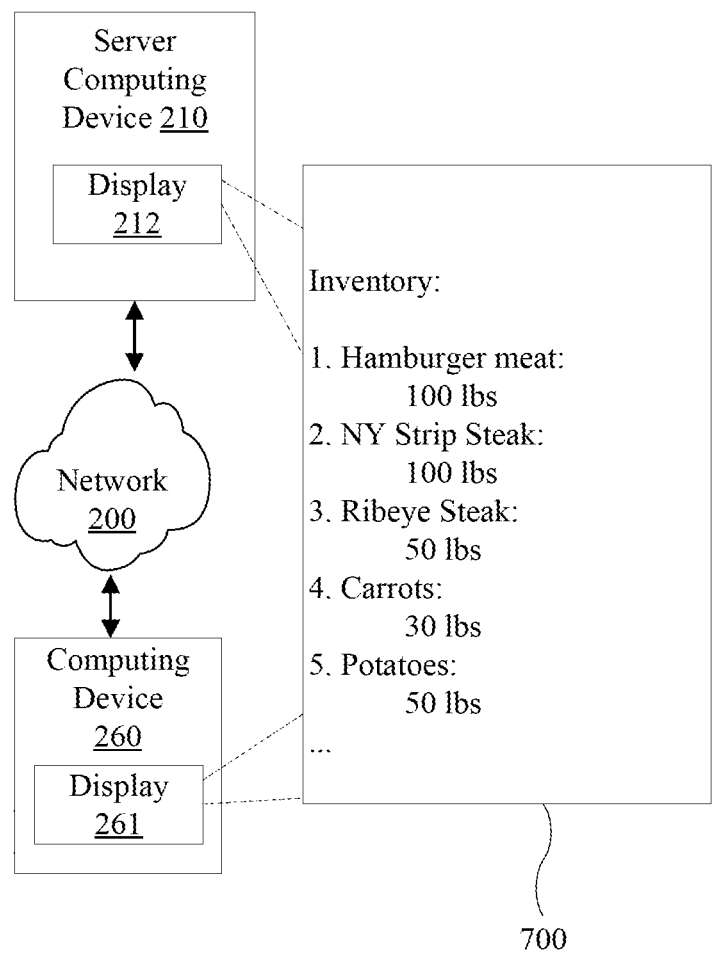
FIG. 7 shows an example user interface presenting an inventory of food in weight in accordance with various embodiments.

FIG. 7 shows an example user interface 700 presenting an inventory of food in weight in accordance with various embodiments. The user interface 700 may be presented on the display 212 of the server computing device 210 and/or the display 261 of the computing device 260. For example, a restaurant owner or employee may desire to see the inventory of food at any given time. The server computing device 210 may query the data store 214 for the inventory of food and present the inventory of food per pound for each type of food. As depicted, the inventory includes 1. Hamburger meat: 100 lbs; 2. NY strip steak: 100 lbs; 3. Ribeye steak: 50 lbs; 4. Carrots: 30 lbs; 5. Potatoes: 50 lbs. The inventory may include data related to food stored in the kitchen and/or that is contained in the containers 236 at the food stations 120. The inventory may be transmitted by the server computing device 210 to the computing device 260 via the network 200.

Figure 8:
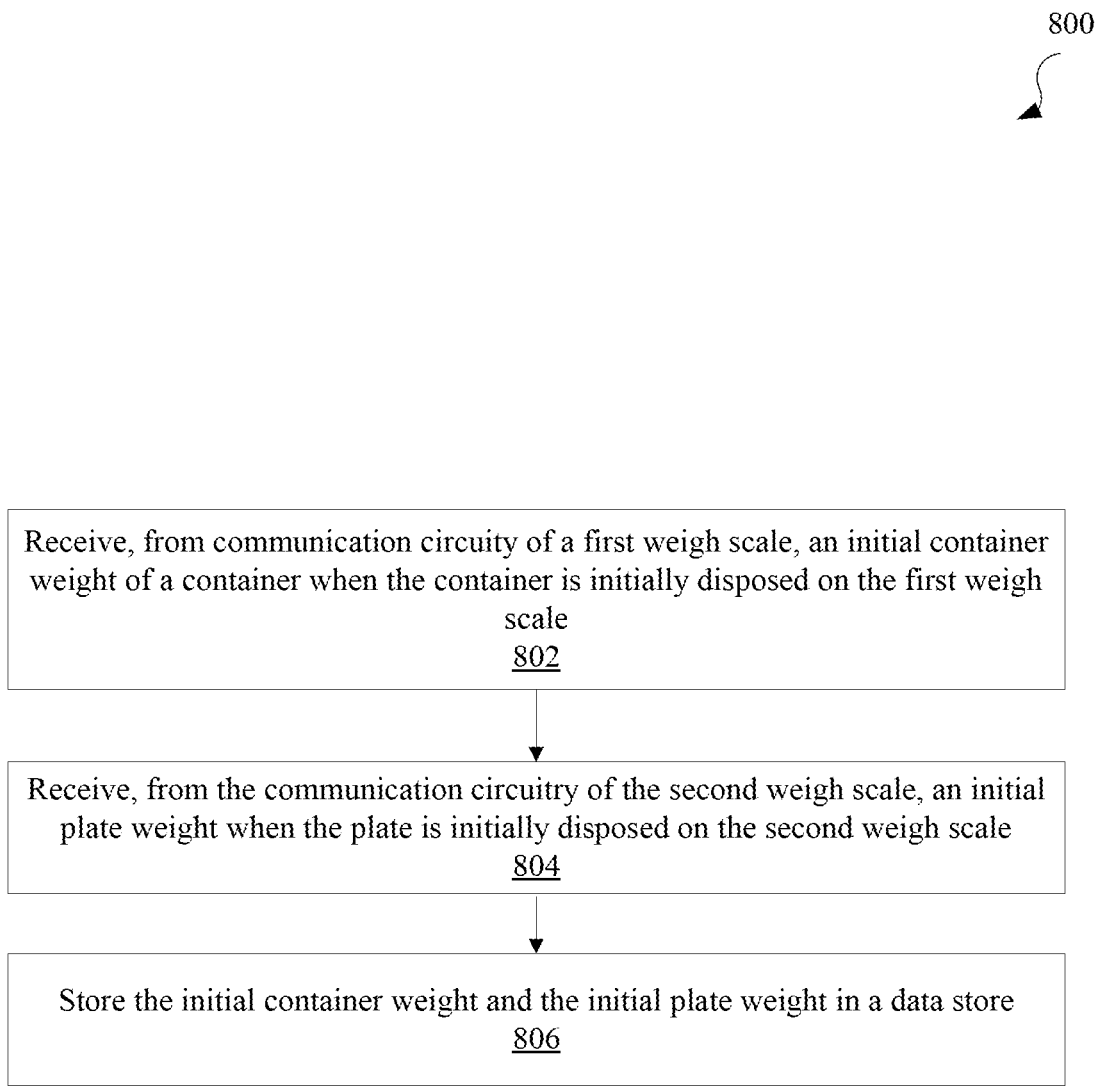
FIG. 8 shows a method in accordance with various embodiments.

FIG. 8 shows a method 800 in accordance with various embodiments. The method 800 may be performed by processing logic that may include hardware (circuitry, dedicated logic, etc.), firmware, software, or a combination of both. The method 800 may establish initial weights for each of the respective containers 236 and the plate 104 at the food stations 120 during a setup phase. The following description relates to the first food station 120-1 but the method 800 may be performed for each of the food stations 120. The method 800 and/or each of their individual functions, subroutines, or operations may be performed by one or more processors of a computing device (e.g., server computing device 210, computing devices 230 of the food stations 120, computing device 260, etc.) implementing the method 800. The method 800 may be implemented as computer instructions that are executable by a processing device. In certain implementations, the method 800 may be performed by a single processing thread. Alternatively, the method 800 may be performed by two or more processing threads, each thread implementing one or more individual functions, routines, subroutines, or operations of the methods. In some embodiments, the operations of the method 800 may be performed by the server computing device 210.

At block 802, the processing device receives, from communication circuitry 239-1 of a first weigh scale 237-1, an initial container weight of a first container 236-1 when the first container 236-1 is initially disposed on the first weigh scale. The first container 236-1 may contain the first food 235-1. At block 804, the processing device receives, from the communication circuitry of the second weigh scale, an initial plate weight when the plate is initially disposed on the second weigh scale. The processing device may also receive an identifier of the plate 104 from a reader 241-1 that reads the ID mechanism 223 and sends the identifier to the server computing device 210. At block 806, the processing device stores the initial container weight and the initial plate weight in a data store. The initial plate weight may be associated with the identifier of the plate 104 in the data store.

Figure 9:
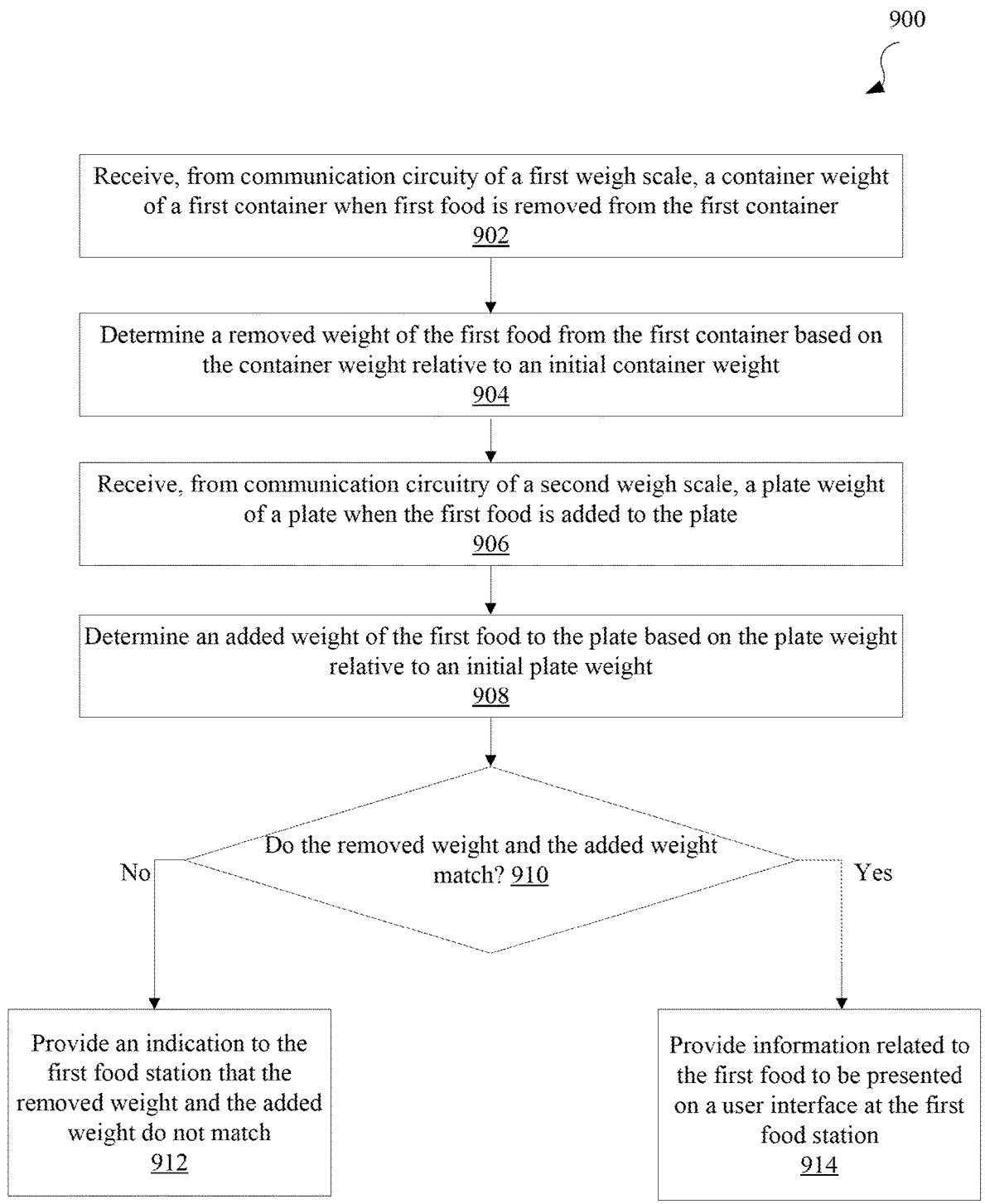
FIG. 9 shows a method in accordance with various embodiments.

FIG. 9 shows a method 900 in accordance with various embodiments. Method 900 includes operations performed by processing devices of a computing system (e.g., server computing device 210, computing devices 230 of the food stations 120, computing device 260, etc.) implementing the method 900. In some embodiments, one or more operations of the method 900 are implemented in computer instructions that are executable by a processing device. In some embodiments, the operations of the method 900 may be performed by the server computing device 210. The method 900 may be performed in the same or a similar manner as described above in regards to method 800.

At block 902, the processing device receives, from communication circuitry 239-1 of a first weigh scale 237-1, a container weight of a first container 236-1 when first food 235-1 is removed from the first container. The first container 236-1 is disposed on the first weigh scale 237-1 at a first food station 120-1.

At block 904, the processing device determines a removed weight of the first food 235-1 from the first container 236-1 based on the container weight relative to an initial container weight. The initial container weight may have been received and stored as described in method 800 of FIG. 8 during a setup phase. The initial container weight may be retrieved from the data store 214.

At block 906, the processing device receives, from communication circuitry 245-1 of a second weigh scale 242-1, a plate weight of a plate 104 when the first food 235-1 is added to the plate 104. The plate 104 is disposed on the second weigh scale 242-1 at the first food station 120-1.

At block 908, the processing device determines an added weight of the first food 235-1 to the plate 104 based on the plate weight relative to an initial plate weight. The initial plate weight may have been received and stored as described in method 800 of FIG. 8 during the setup phase. The initial plate weight may be retrieved from the data store 214.

At block 910, the processing device determines whether the removed weight and the added weight match. If the removed weight and the added weight do not match, the processing device provides, at block 912, an indication to the first food station 120-1 that the removed weight and the added weight do not match. In some embodiments, the indication is transmitted to the computing device 230-1 at the first food station 120-1, and the computing device 230-1 may display a visual indication that the removed weight and the added weight do not match. In some embodiments, the computing device 230-1 may activate the alarm 231-1 to signal that the removed weight and the added weight do not match. The alarm 231-1 may cause an employee of the restaurant to visit the first food station 120-1 and resolve the issue.

If the removed weight and the added weight match, the processing device provides information related to the first food 235-1 to be presented on a user interface at a display 233-1 of the computing device 230-1. The information may include a price of the first food 235-1 determined per pound of the first food 235-1 based on the removed weight or the added weight of the first food 235-1. The information may also include nutritional facts of the first food 235-1 determined per pound of the first food 235-1 based on the removed weight or the added weight of the first food 235-1. The information may also include the added weight of the first food 235-1 to the plate 104.

In some embodiments, the processing device may determine when the container weight satisfies a threshold condition. The threshold condition may be a minimum accepted weight of the first food 235-1 in the first container 236-1. Responsive to determining that the container weight satisfies the threshold condition, the processing device may transmit an indication to the computing device 233-1 of the food station 120-1. The indication may indicate to refill the first food 235-1 in the first container 236-1 by a certain amount of weight.

Figure 10:
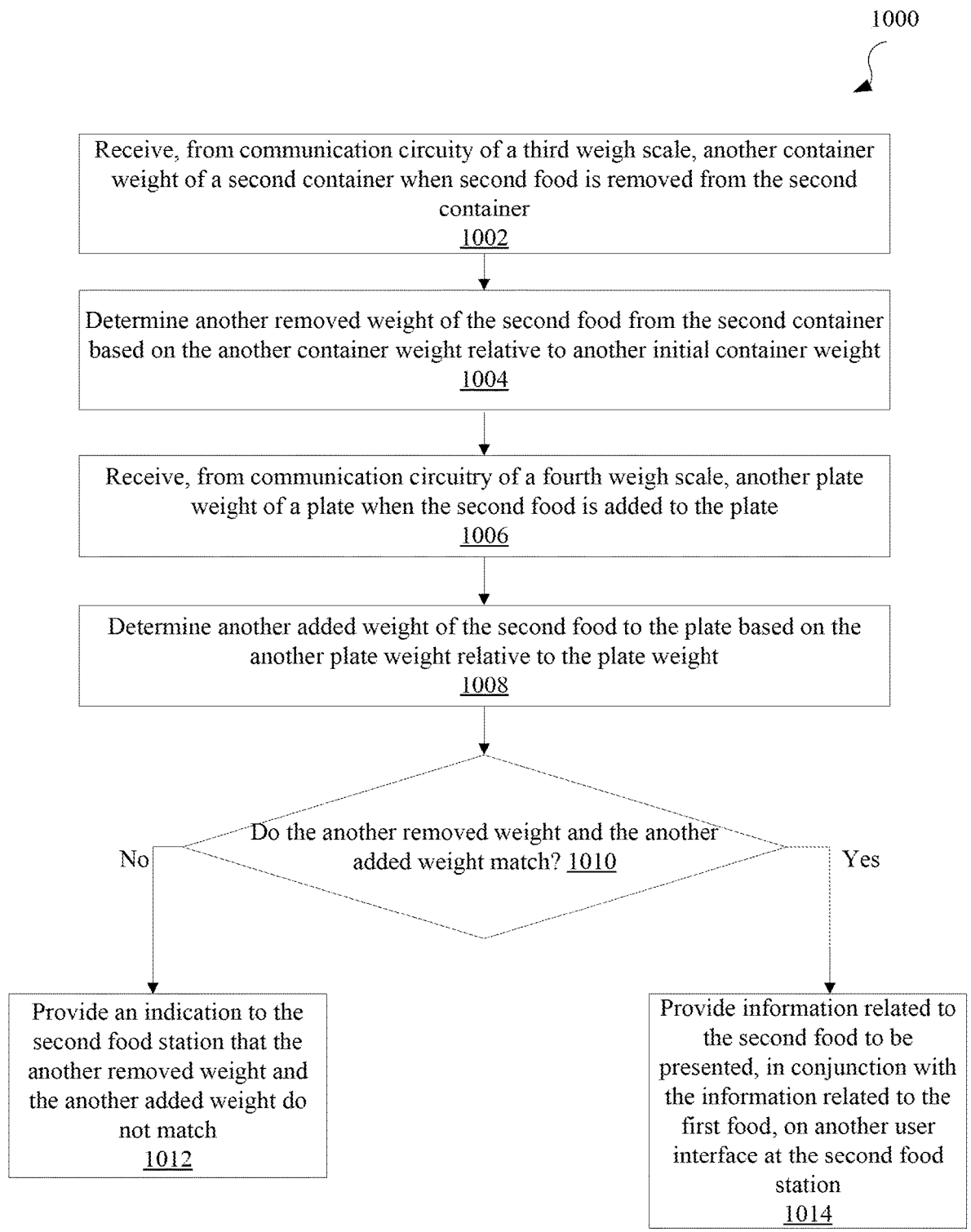
FIG. 10 shows a method in accordance with various embodiments.

FIG. 10 shows a method 1000 in accordance with various embodiments.

Method 1000 includes operations performed by processing devices of a computing system (e.g., server computing device 210, computing devices 230 of the food stations 120, computing device 260, etc.) implementing the method 1000. In some embodiments, one or more operations of the method 1000 are implemented in computer instructions that are executable by a processing device. In some embodiments, the operations of the method 1000 may be performed by the server computing device 210. The method 1000 may be performed in the same or a similar manner as described above in regards to method 800.

At block 1002, the processing device receives, from communication circuitry 239-2, of a third weigh scale 237-2, another container weight of a second container 236-2 when second food 235-2 is removed from the second container 236-2. The second container 236-2 is disposed on the third weigh scale 237-2 at a second food station 120-2.

At block 1004, the processing device determines a removed weight of the second food 235-2 from the second container 236-2 based on the another container weight relative to another initial container weight. The another initial container weight may have been received and stored as described in method 800 of FIG. 8 during a setup phase. The another initial container weight may be retrieved from the data store 214.

At block 1006, the processing device receives, from communication circuitry 245-2 of a fourth weigh scale 242-2, another plate weight of the plate 104 when the second food 235-2 is added to the plate 104. The plate 104 is disposed on the fourth weigh scale 242-1 at the second food station 120-2.

At block 1008, the processing device determines another added weight of the second food to the plate based on the another plate weight relative to the plate weight received at block 906 in method 900 of FIG. 9.

At block 1010, the processing device determines whether the another removed weight and the another added weight match. If the another removed weight and the another added weight do not match, the processing device provides, at block 1012, an indication to the second food station 120-2 that the another removed weight and the another added weight do not match. In some embodiments, the indication is transmitted to the computing device 230-2 at the second food station 120-2, and the computing device 230-2 may display a visual indication that the another removed weight and the another added weight do not match. In some embodiments, the computing device 230-2 may activate the alarm 231-2 to signal that the another removed weight and the another added weight do not match. The alarm 231-2 may cause an employee of the restaurant to visit the second food station 120-2 and resolve the issue.

If the another removed weight and the another added weight match, the processing device provides information related to the second food 235-2 to be presented, in conjunction with the information related to the first food 235-1, on another user interface at the second food station 230-2. For example, the information is presented on the user interface on the display 233-2 at the computing device 230-2. The information may include may include a price of the first food 235-1 determined per pound based on the added weight of the first food 235-1, nutritional facts of the first food 235-1 determined per pound of the first food 235-1, and the added weight of the first 235-1 that is added to the plate 104. The information may also include a price of the second food 235-2 determined per pound based on the added weight of the second food 235-2, nutritional facts of the second food 235-2 determined per pound of the second food 235-2, and the added weight of the second food 235-2 that is added to the plate 104. Further, the information may also include a total price for the first food 235-1 and second food 235-2 that are added to the plate 104 per pound for each item, total nutritional facts of the first food 235-1 and second food 235-2 that are added to the plate 104 per pound, and a combined weight of the first food 235-1 and second food 235-2 that are added to the plate 104.

Accordingly, in some embodiments, the processing device may determine a combined data selected from the group consisting of a combined price of the first food per pound and the second food per pound, and combined nutritional facts of the first food per pound and the second food per pound. The processing device may provide the combined data to be presented on the user interface at the second food station 120-2.

FIG. 11 shows a method 1100 in accordance with various embodiments. The method 1100 provides operations for handling a scenario where an item besides food from a first container 236-1 at a first food station 120-1 is added to the plate 104. Method 1100 includes operations performed by processing devices of a computing system (e.g., server computing device 210, computing devices 230 of the food stations 120, computing device 260, etc.) implementing the method 1100. In some embodiments, one or more operations of the method 1100 are implemented in computer instructions that are executable by a processing device. In some embodiments, the operations of the method 1100 may be performed by the server computing device 210. The method 1100 may be performed in the same or a similar manner as described above in regards to method 800.

At block 1102, the processing device receives, from communication circuitry of the second weigh scale, another plate weight of the plate 104 when an item 600 is added to the plate 104. The item 600 may be any non-food item, such as a mobile phone, a toy, a purse, money, etc.

At block 1104, the processing device determines another added weight of the item 600 to the plate 104 based on the another plate weight relative to the plate weight. The second weigh scale 242-1 may measure the weight of the plate 104 with the item 600 and transmit the measured weight to the server computing device 210. The server computing device 210 may determine that difference between the new measured weight and a previous plate weight to determine the weight of the item that is added.

At block 1106, the processing device determines whether another removed weight of food from the first container 236-1 corresponding to the another added plate weight was received from the communication circuitry 239-1 of the first weigh scale 237-1. At block 1108, responsive to determining that the another removed weight of food from the first container 236-1 corresponding to the another added plate weight was not received, the processing device provides an error indication to the first food station 120-1 that specifies that the item 600 is placed on the plate 104. For example, the indication is sent to the computing device 230-1 of the first food station 120-1.

Figure 12:
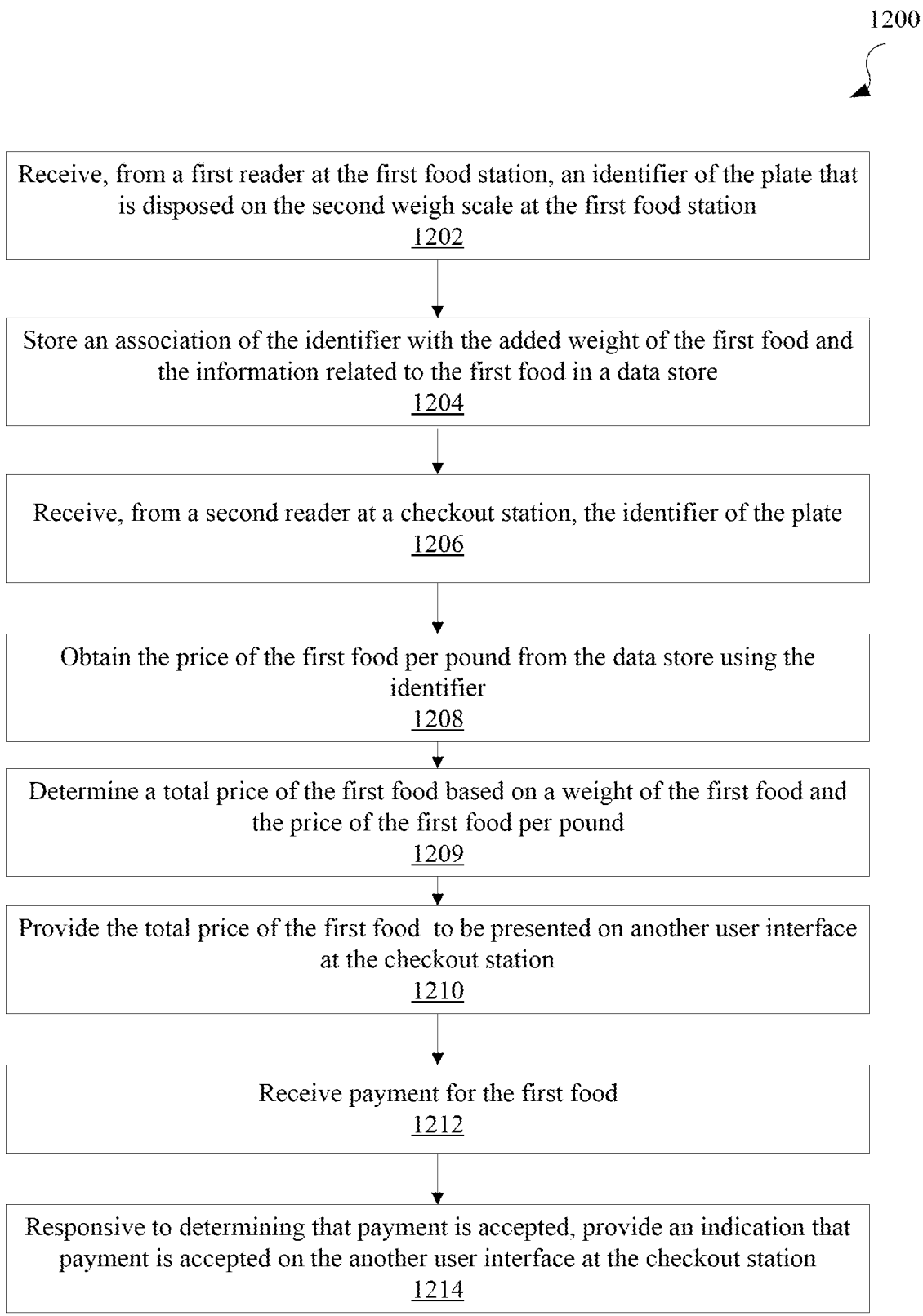
FIG. 12 shows a method in accordance with various embodiments.

FIG. 12 shows a method 1200 in accordance with various embodiments. Method 1200 includes operations performed by processing devices of a computing system (e.g., server computing device 210, computing devices 230 of the food stations 120, computing device 260, etc.) implementing the method 1200. In some embodiments, one or more operations of the method 1200 are implemented in computer instructions that are executable by a processing device. In some embodiments, the operations of the method 1200 may be performed by the server computing device 210. The method 1200 may be performed in the same or a similar manner as described above in regards to method 800.

At block 1202, the processing device receives, from a first reader 241-1 at the first food station 120-1, an identifier of the plate 104 that is disposed on the second weigh scale 242-1 at the first food station 120-1. The reader 241-1 reads the ID mechanism 223 to obtain the identifier. At block 1204, the processing device stores an association of the identifier with the added weight of the first food 235-1 and the information related to the first food 235-1 in a data store 214.

At block 1206, the processing device receives, from a second reader 250 at a checkout station 130, the identifier of the plate 104. The reader 250 reads the ID mechanism 223 to obtain the identifier. At block 1208, the processing device obtains the price of the first food 235-1 per pound and a weight of the first food 235-1 added to the plate 104 from the data store 214 using the identifier. At block 1210, the processing device determines a total price of the first food based on the weight of the first food 235-1 and the price of the first food 235-1 per pound. In some embodiments, the total price may have been already determined and stored in the data store 214. At block 1210, the processing device provides the total price of the first food 235-1 on another user interface at the checkout station 130. For example, the computing device 251 presents the another user interface on the display 254. At block 1212, the processing device receives payment for the first food 235-1. At block 1214, responsive to determining that payment is accepted, the processing device provides an indication that payment is accepted on the another user interface at the checkout station 130.

FIG. 13 shows a method 1300 in accordance with various embodiments. Method 1300 includes operations performed by processing devices of a computing system (e.g., server computing device 210, computing devices 230 of the food stations 120, computing device 260, etc.) implementing the method 1300. In some embodiments, one or more operations of the method 1300 are implemented in computer instructions that are executable by a processing device. In some embodiments, the operations of the method 1300 may be performed by the server computing device 210. The method 1300 may be performed in the same or a similar manner as described above in regards to method 800.

At block 1302, the processing device activates a locking mechanism 243-1 to secure a plate 104 in place when the plate is initially disposed on the second weigh scale 242-1 at the first food station 120-1. At block 1304, responsive to determining that the removed weight and the added weight do not match, the processing device maintains the locking mechanism 243-1 in a locked position. At block 1306, responsive to determining that the removed weight and the added weight match, the processing device deactivates the locking mechanism 243-1 to release the plate 104.

Figure 14:
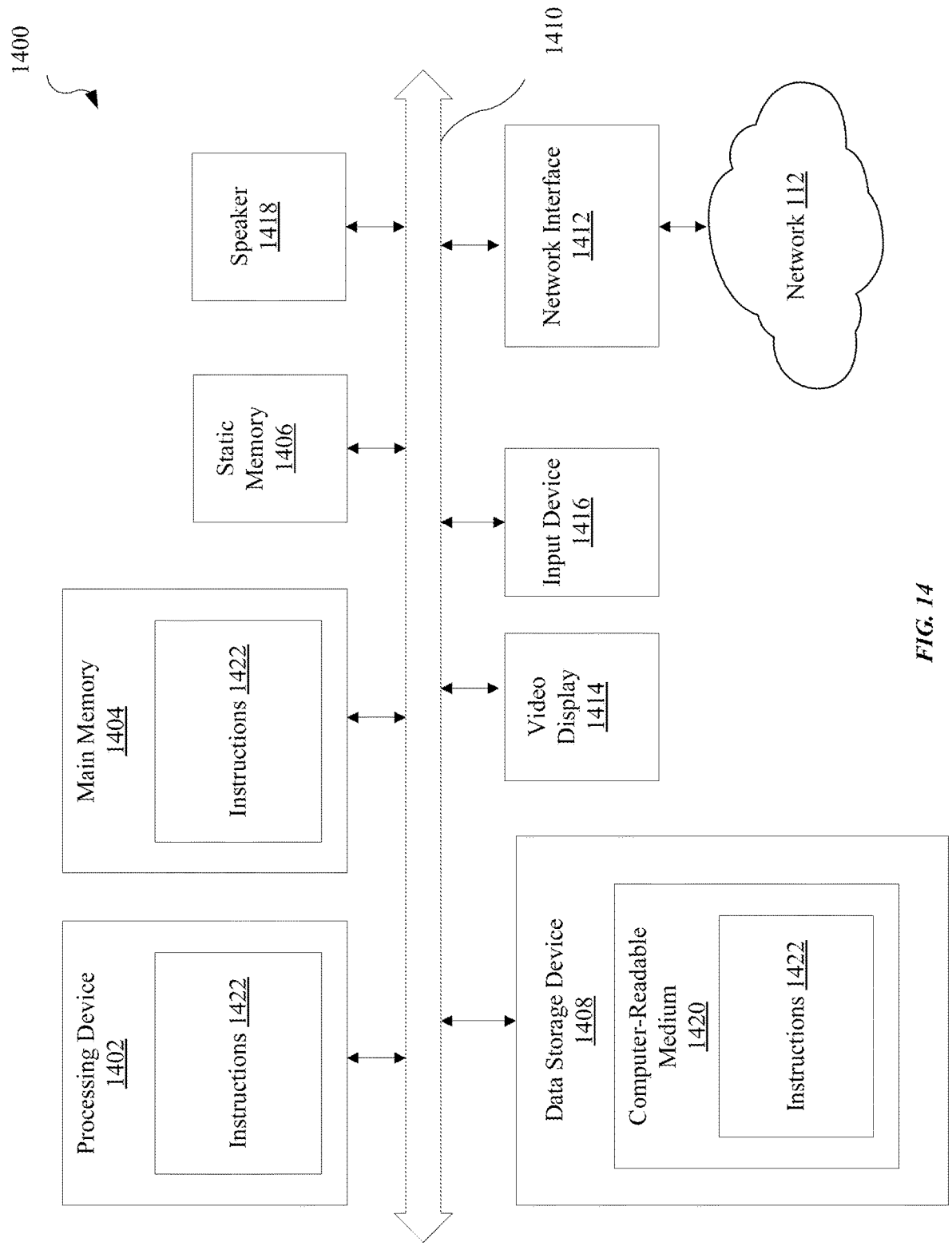
FIG. 14 shows a computer system in accordance with various embodiments.

FIG. 14 shows a computer system 1400 in accordance with various embodiments. In one example, computer system 1400 may correspond to the server computing device 210, computing device 222, computing device 230-1, computing device 251, and/or computing device 260. Various components of the computer system 1400 may be included in the reader 220, camera 270, the weigh scale 237, the lid 238, the lock mechanism 240-1, the reader 241, the weigh scale 242, the lock mechanism 243, and/or the reader 250. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a reader, a camera, a lock mechanism, a weigh scale, a lid, a set-top box (STB), a personal Digital Assistant (PDA), a mobile phone, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1400 includes a processing device 1402, a main memory 1404 (e.g., read-only memory (ROM), flash memory, dynamic random access memory (DRAM) such as synchronous DRAM (SDRAM)), a static memory 1406 (e.g., flash memory, static random access memory (SRAM)), and a data storage device 1408, which communicate with each other via a bus 1410.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 may also be one or more special-purpose processing devices such as an application specific integrated circuit (ASIC), a field programmable gate array (FPGA), a digital signal processor (DSP), network processor, or the like. The processing device 1402 is configured to execute instructions for performing any of the operations and steps discussed herein.

The computer system 1400 may further include a network interface device 1412. The computer system 1400 also may include a video display 1414 (e.g., a liquid crystal display (LCD) or a cathode ray tube (CRT)), one or more input devices 1416 (e.g., a keyboard and/or a mouse), and one or more speakers 1418 (e.g., a speaker). In one illustrative example, the video display 1414 and the input device(s) 1416 may be combined into a single component or device (e.g., an LCD touch screen).

The data storage device 1416 may include a computer-readable medium 1420 on which the instructions 1422 (e.g., implementing any methods and any functions performed by any device and/or component depicted in the FIGURES and described herein) embodying any one or more of the methodologies or functions described herein is stored. The instructions 1422 may also reside, completely or at least partially, within the main memory 1404 and/or within the processing device 1402 during execution thereof by the computer system 1400. As such, the main memory 1404 and the processing device 1402 also constitute computer-readable media. The instructions 1422 may further be transmitted or received over a network via the network interface device 1412.

While the computer-readable storage medium 1420 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for a server computing device, comprising:
    receiving, from communication circuitry of a first weigh scale, a container weight of a first container when a first food is removed from the first container, wherein the first container is disposed on the first weigh scale at a first food station;
    determining a removed weight of the first food from the first container based on the container weight relative to an initial container weight;
    receiving, from communication circuitry of a second weigh scale, a plate weight of a plate when the first food is added to the plate, wherein the plate is disposed on the second weigh scale at the first food station;
    determining an added weight of the first food to the plate based on the plate weight relative to an initial plate weight;
    determining whether the removed weight and the added weight match;
    responsive to determining that the removed weight and the added weight match, providing information related to the first food on a user interface at the first food station;
    receiving, from the communication circuitry of the second weigh scale, a second plate weight of the plate when an item is added to the plate;
    determining a second added weight of the item to the plate based on the second plate weight relative to the plate weight;
    determining whether a second removed weight of food from the first container corresponding to the second added plate weight was received from the communication circuitry of the first weigh scale; and
    responsive to determining that the second removed weight of food from the first container corresponding to the second added plate weight was not received, providing an error indication at the first food station that the item is placed on the plate.

2. The method of claim 1, further comprising:
    receiving, from communication circuitry of a third weigh scale, another container weight of a second container when a second food is removed from the second container, wherein the second container is disposed on the third weigh scale at a second food station;
    determining another removed weight of the second food from the second container based on the another container weight relative to another initial container weight;
    receiving, from communication circuitry of a fourth weigh scale, another plate weight of the plate when the second food is added to the plate, wherein the plate is disposed on the fourth weigh scale at the second food station;
    determining another added weight of the second food to the plate based on the another plate weight relative to the plate weight;
    determining whether the another removed weight and the another added weight match; and
    responsive to determining that the another removed weight and the another added weight match, providing other information related to the second food, in conjunction with the information related to the first food, on another user interface at the second food station.

3. The method of claim 2, further comprising:
    determining a combined data selected from the group comprising of a combined price of the first food that is determined per pound and the second food that is determined per pound, and combined nutritional facts of the first food that are determined per pound and the second food per pound; and
    providing the combined data to be presented on the another user interface at the second food station.

4. The method of claim 1, further comprising:
    receiving, from a first reader at the first food station, an identifier of the plate that is disposed on the second weigh scale at the first food station; and
    storing an association of the identifier with the added weight of the first food and the information related to the first food in a data store, wherein the information comprises a price of the first food per pound, and nutritional facts of the first food per pound.

5. The method of claim 4, further comprising:
    receiving, from a second reader at a checkout station, the identifier of the plate;
    obtaining the price of the first food per pound from the data store using the identifier;
    determining a total price of the first food based on a weight of the first food and the price of the first food per pound;
    providing the total price of the first food on another user interface at the checkout station;
    receiving payment for the first food; and
    responsive to determining that the payment is accepted, providing an indication that the payment is accepted on the another user interface at the checkout station.

6. The method of claim 1, wherein the information comprises:
   a price of the first food based on the removed weight or the added weight of the first food; and
   nutritional facts of the first food based on the removed weight or the added weight of the first food.

7. The method of claim 1, further comprising:
   receiving, from the communication circuitry of the first weigh scale, the initial container weight of the first container when the first container is initially disposed on the first weigh scale;
   receiving, from the communication circuitry of the second weigh scale, the initial plate weight of the plate when the plate is initially disposed on the second weigh scale; and
   storing the initial container weight and the initial plate weight in a data store.

8. The method of claim 1, further comprising, responsive to determining that the removed weight and the added weight do not match, providing an indication to the first food station that the removed weight and the added weight do not match.

9. The method of claim 1, further comprising:
   determining when the container weight satisfies a threshold condition; and
   responsive to determining that the container weight satisfies the threshold condition, transmitting an indication to a computing device, wherein the indication indicates to refill food in the first container.

10. A tangible, non-transitory computer-readable medium storing instructions that, when executed by a processing device, cause the processing device to:
    receive, from communication circuitry of a first weigh scale, a container weight of a first container when a first food is removed from the first container, wherein the first container is disposed on the first weigh scale at a first food station;
    determine a removed weight of the first food from the first container based on the container weight relative to an initial container weight;
    receive, from communication circuitry of a second weigh scale, a plate weight of a plate when the first food is added to the plate, wherein the plate is disposed on the second weigh scale at the first food station;
    determine an added weight of the first food to the plate based on the plate weight relative to an initial plate weight;
    determine whether the removed weight and the added weight match; and
    responsive to determining that the removed weight and the added weight match, provide information related to the first food on a user interface at the first food station, wherein the information related to the first food comprises a price of the first food determined per pound and nutritional facts of the first food determined per pound, and the price and the nutritional facts are presented on respective user interfaces at each of a plurality of food stations.

11. The computer-readable medium of claim 10, wherein the processing device is further configured to:
    receive, from communication circuitry of a third weigh scale, another container weight of a second container when a second food is removed from the second container, wherein the second container is disposed on the third weigh scale at a second food station;
    determine another removed weight of the second food from the second container based on the another container weight relative to another initial container weight;
    receive, from communication circuitry of a fourth weigh scale, another plate weight of the plate when the second food is added to the plate, wherein the plate is disposed on the fourth weigh scale at the second food station;
    determine another added weight of the second food to the plate based on the another plate weight relative to the plate weight;
    determine whether the another removed weight and the another added weight match; and
    responsive to determining that the another removed weight and the another added weight match, provide other information related to the second food, in conjunction with the information related to the first food, on another user interface at the second food station.

12. The computer-readable medium of claim 10, wherein the processing device is further configured to:
    determine a combined data selected from the group comprising of a combined price of the first food that is determined per pound and the second food that is determined per pound, and combined nutritional facts of the first food per pound and the second food per pound; and
    provide the combined data to be presented on the another user interface at the second food station.

13. The computer-readable medium of claim 10, wherein the processing device is further configured to:
    receive, from a first reader at the first food station, an identifier of the plate that is disposed on the second weigh scale at the first food station; and
    store an association of the identifier with the added weight of the first food and the information related to the first food in a data store.

14. The computer-readable medium of claim 13, wherein the processing device is further configured to:
    receive, from a second reader at a checkout station, the identifier of the plate;
    obtain the price of the first food per pound from the data store using the identifier;
    determining a total price of the first food based on a weight of the first food and the price of the first food per pound;
    provide the total price of the first food to be presented on another user interface at the checkout station;
    receive payment for the first food; and
    responsive to determining that payment is accepted, provide an indication that payment is accepted on the another user interface at the checkout station.

15. A system, comprising:
    a plurality of food stations, each food station comprising:
       a first location comprising a first weigh scale and a container disposed on the first weigh scale, wherein the container contains food and the first weigh scale configured to weigh the container;
       a second location comprising a second weigh scale configured to weigh a plate; and
       an alarm; and
    a computing device comprising:
       a network interface communicatively coupled to the first weigh scale, the second weigh scale, and the alarm of each of the plurality of food stations;
       a memory device storing instructions;

a processing device operatively coupled to the network interface and the memory device, wherein the instructions cause the processing device to:
receive, from the first weigh scale of a first food station of the plurality of food stations, a container weight when a first food is removed from the container;
determine a removed weight of the first food from the container based on the container weight relative to an initial container weight;
receive, from the second weigh scale of the first food station, a plate weight of the plate when the first food is added to the plate;
determine an added weight of the food to the plate based on the plate weight relative to an initial plate weight;
determine whether the removed weight and the added weight match; and
responsive to determining that the removed weight and the added weight do not match, provide an instruction to cause the alarm to activate,
wherein each food station further comprises a locking mechanism at the second location, wherein the locking mechanism is configured to secure the plate in place; and
the processing device is further configured to:
activate the locking mechanism to secure the plate in place when the plate is initially disposed on the second weigh scale;
responsive to determining that the removed weight and the added weight do not match, maintain the locking mechanism in a locked position; and
responsive to determining that the removed weight and the added weight match, deactivate the locking mechanism to release the plate.

16. The system of claim 15, wherein:
each food station further comprises a locking mechanism at the second location, wherein the locking mechanism is configured to secure the plate in place; and
the processing device is further configured to:
activate the locking mechanism to secure the plate in place when the plate is initially disposed on the second weigh scale;
responsive to determining that the removed weight and the added weight do not match, maintain the locking mechanism in a locked position; and
responsive to determining that the removed weight and the added weight match, deactivate the locking mechanism to release the plate.

17. The system of claim 15, wherein the processing device is further configured to:
maintain a cumulative removed weight of food from the container over a period of time; and
provide a recommendation to a computing device, wherein the recommendation recommends serving at least a weight of the food for the period of time in the future based on the cumulative removed weight of food.

18. The system of claim 15, wherein the initial container weight comprises a weight of the container, a weight of the food in the container, and a weight of a serving utensil in the container.

19. A system, comprising:
a plurality of food stations, each food station comprising:
a first location comprising a first weigh scale and a container disposed on the first weigh scale, wherein the container contains food and the first weigh scale configured to weigh the container;
a second location comprising a second weigh scale configured to weigh a plate; and
an alarm; and
a computing device comprising:
a network interface communicatively coupled to the first weigh scale, the second weigh scale, and the alarm of each of the plurality of food stations;
a memory device storing instructions;
a processing device operatively coupled to the network interface and the memory device, wherein the instructions cause the processing device to:
receive, from the first weigh scale of a first food station of the plurality of food stations, a container weight when a first food is removed from the container;
determine a removed weight of the first food from the container based on the container weight relative to an initial container weight;
receive, from the second weigh scale of the first food station, a plate weight of the plate when the first food is added to the plate;
determine an added weight of the food to the plate based on the plate weight relative to an initial plate weight;
determine whether the removed weight and the added weight match; and
responsive to determining that the removed weight and the added weight do not match, provide an instruction to cause the alarm to activate,
wherein the processing device is further configured to:
maintain a cumulative removed weight of food from the container over a period of time; and
provide a recommendation to a computing device, wherein the recommendation recommends serving at least a weight of the food for the period of time in the future based on the cumulative removed weight of food.

* * * * *